US009229635B2

(12) United States Patent
Sim

(10) Patent No.: US 9,229,635 B2
(45) Date of Patent: Jan. 5, 2016

(54) WIRELESS HANDHELD DEVICE ABLE TO ACCEPT TEXT INPUT AND METHODS FOR INPUTTING TEXT ON A WIRELESS HANDHELD DEVICE

(75) Inventor: Wong Hoo Sim, Singapore (SG)

(73) Assignee: Creative Technology Ltd, Singapore (SG)

( * ) Notice: Subject to any disclaimer, the term of this patent is extended or adjusted under 35 U.S.C. 154(b) by 521 days.

(21) Appl. No.: 12/739,728

(22) PCT Filed: Sep. 16, 2008

(86) PCT No.: PCT/SG2008/000351
§ 371 (c)(1),
(2), (4) Date: Apr. 23, 2010

(87) PCT Pub. No.: WO2009/054809
PCT Pub. Date: Apr. 30, 2009

(65) Prior Publication Data
US 2010/0245276 A1  Sep. 30, 2010

(30) Foreign Application Priority Data

Oct. 26, 2007 (SG) ................ 200717228-1

(51) Int. Cl.
*G06F 3/0488* (2013.01)
*G06F 3/16* (2006.01)
(52) U.S. Cl.
CPC ............ *G06F 3/04886* (2013.01); *G06F 3/167* (2013.01)
(58) Field of Classification Search
USPC .................. 345/156–178; 434/116
See application file for complete search history.

(56) References Cited

U.S. PATENT DOCUMENTS

| 6,597,345 | B2 | 7/2003 | Hirshberg | |
|---|---|---|---|---|
| 6,776,546 | B2 | 8/2004 | Kraus et al. | |
| 6,865,533 | B2* | 3/2005 | Addison et al. | 704/260 |
| 6,882,337 | B2* | 4/2005 | Shetter | 345/173 |
| 6,882,859 | B1 | 4/2005 | Rao et al. | |
| 7,030,861 | B1* | 4/2006 | Westerman et al. | 345/173 |
| 7,952,498 | B2* | 5/2011 | Higa | 345/173 |
| 2002/0027549 | A1* | 3/2002 | Hirshberg | 345/168 |
| 2003/0083020 | A1* | 5/2003 | Langford | 455/90 |
| 2004/0267528 | A9* | 12/2004 | Roth et al. | 704/251 |
| 2006/0242576 | A1* | 10/2006 | Nagel et al. | 715/535 |
| 2006/0267966 | A1* | 11/2006 | Grossman et al. | 345/179 |
| 2007/0212668 | A1* | 9/2007 | Takami et al. | 434/113 |
| 2008/0167081 | A1* | 7/2008 | Eng | 455/566 |

* cited by examiner

*Primary Examiner* — Ryan A Lubit
(74) *Attorney, Agent, or Firm* — Russell Swerdon; Desmund Gean

(57) ABSTRACT

A wireless handheld device able to accept text input, including a display screen and a virtual keypad having a plurality of keys displayed on the display screen, wherein a first key of the virtual keypad is operable to display a first character associated with the first key in a text passage shown on the display screen in response to a first contact of a pointer with a first area on the display screen corresponding to the first key, the first contact including the pointer contacting and moving from the first area along a first direction while the pointer is in continual contact with the display screen, and wherein the first key of the virtual keypad is also operable to display a second character associated with the first key in the text passage shown on the display screen in response to a second contact of the pointer with the first area the display screen corresponding to the first key, the second contact including the pointer contacting and moving fro the first area along a second direction while the pointer is in continual contact with the display screen.

21 Claims, 19 Drawing Sheets

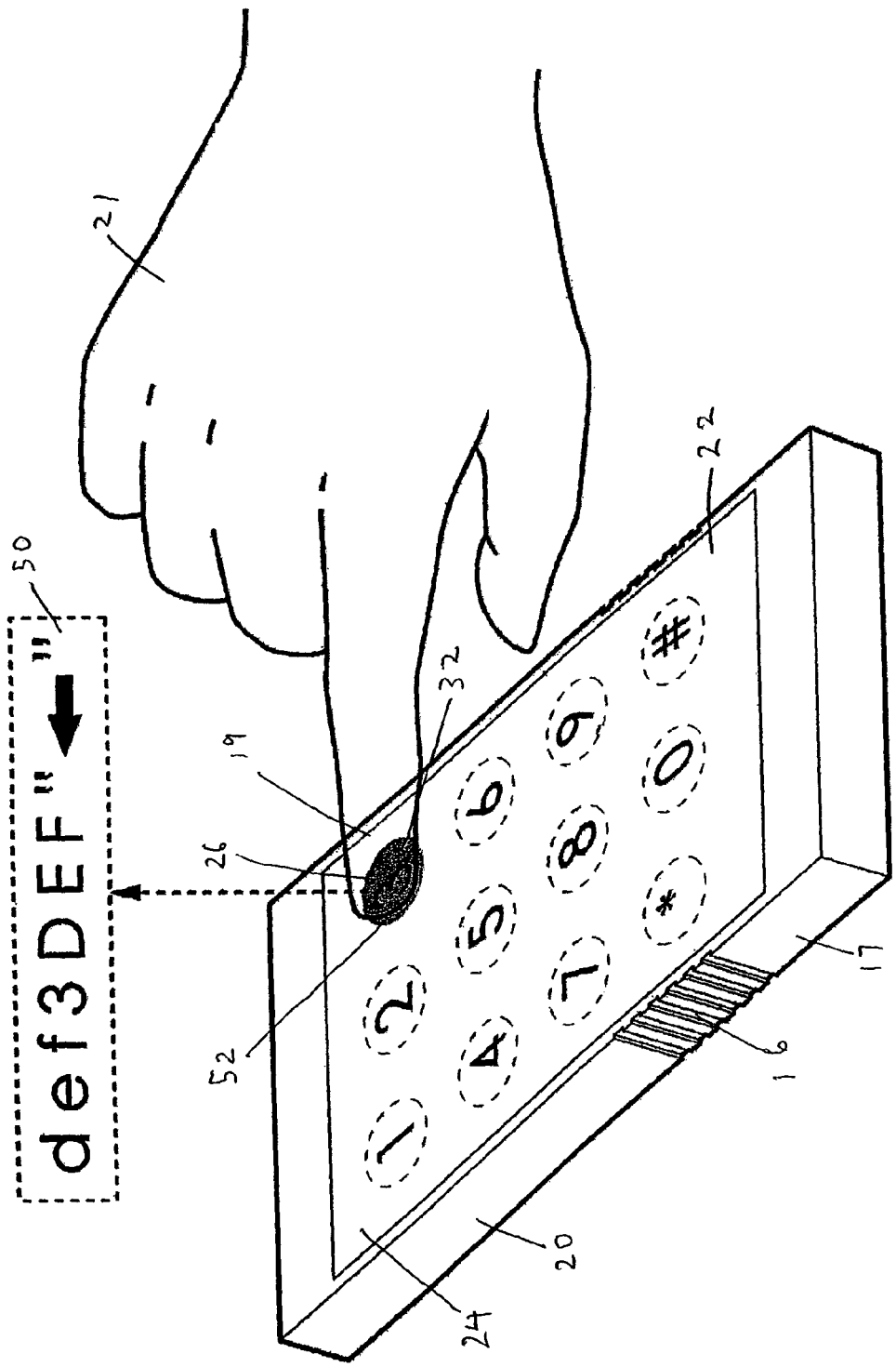

WIRELESS HANDHELD DEVICE ABLE TO ACCEPT TEXT INPUT AND METHODS FOR INPUTTING TEXT ON A WIRELESS HANDHELD DEVICE

FIELD OF INVENTION

The present invention generally relates to wireless handheld devices for communication, and particularly, relates to input of text into the aforementioned devices.

BACKGROUND

Numeric keypads are commonly found in handheld electronic devices which may not be able to incorporate a QWERTY keyboard due to size constraints. These devices may include, for example, mobile phones, media players, remote controls and so forth. The increasing number of communication functions incorporated in the aforementioned devices, such as, for example, instant messaging, short string messaging and the like has led to a need for text input using these numeric keypads.

A common way to input text using a numeric keypad is the "multi-tap" method where keys 2 to 9 are labeled with the letters A-Z in a way that every key is labeled with either 3 or 4 letters. In order to enter text, letters can be typed by activating the corresponding key repeatedly. For example, key 6 is labeled with the letters "MNO". A single key press leads to an M, a double key press results in an N while pressing the key three times produces the letter O. While this method is commonplace, it is undeniable that it requires a high level of dexterity for a user's fingers and is also rather tedious.

Another common method of inputting test using a numeric keypad relates to Predictive Text Input systems. In this method, the desired word/phrase is proposed from an initial sequence of single key presses. For example, if the key 2 is pressed twice and the key 3 is pressed once, then words like "BET, BELL, BETTER" and so forth may be suggested. However, the accuracy of such systems is questionable especially when entering names, addresses and abbreviations, and may hamper rather than improve text input.

SUMMARY

In a first aspect, there is provided a wireless handheld device able to accept text input. The device includes a display screen; and a virtual keypad having a plurality of keys displayed on the display screen. A first key of the virtual keypad is operable to display a first character associated with the first key in a text passage shown on the display screen in response to a first contact of a pointer with a first area on the display screen corresponding to the first key, the first contact including the pointer contacting and moving from the first area along a first direction while the pointer is in continual contact with the display screen. It is preferable that the first key of the virtual keypad is also operable to display a second character associated with the first key in the text passage shown on the display screen in response to a second contact of the pointer with the first area on the display screen corresponding to the first key, the second contact including the pointer contacting and moving from the first area along a second direction while the pointer is in continual contact with the display screen. The pointer may be either a finger, or a stylus pointer.

The device may provide feedback in accordance with the character selected by a user for display in the text passage. The feedback may be either an aural representation of the character or a visual representation of the character. It is advantageous that the aural feedback allows a user to input characters into the device without viewing the display screen.

Preferably, the first key of the virtual keypad is operable to display a third character associated with the first key in the text passage shown on the display screen in response to a first contact occurrence between a pointer and the first area on the display screen corresponding to the first key, contact occurrence being prolonged unbroken contact with the first key. The first key of the virtual keypad may also be operable to change a mode associated with the first key in the text passage shown on the display screen in response to at least two successive contact occurrences between the pointer and the first area on the display screen corresponding to the first key. The mode may relate to capitalizing and de-capitalizing the characters generated in the text passage shown on the display screen.

It is preferable that determining the directions is by comparing a subsequent location of the pointer with the first area on the display screen. The device may be, for example, a mobile phone, a media player, a remote controller, a PDA and the like.

The device may advantageously further include at least one physical marker to aid a user in grasping the device when inputting text, the at least one physical marker being, for example, a variation in feel on a case of the device, a notch on the display screen, a depression on the display screen, a rough surfaced area on the display screen and receptors on the case as a guide for fingers and so forth.

The device may preferably further include a "key location" mode to accurately locate a first key and input text using the virtual keypad after de-activation of the "key location" mode by referencing other keys of the virtual keypad with the first key.

In a second aspect, there is provided a wireless handheld device able to accept text input. The device includes a display screen; and a virtual keypad having a plurality of keys displayed on the display screen. It is preferable that a first key of the virtual keypad is operable to present a selection of characters associated with the first key for use in a text passage shown on the display screen in response to a first contact occurence of a pointer with a first area on the display screen corresponding to the first key, contact occurrence being prolonged unbroken contact with the first key. A character from the selection of characters is then selected in response an action of the pointer. The pointer may be either a finger or a stylus pointer.

The device may provide feedback in accordance with the character selected by a user for display in the text passage. The feedback may be either an aural representation of the character or a visual representation of the character. It is advantageous that the aural feedback allows a user to input characters into the device without viewing the display screen. The device may be, for example, a mobile phone, a media player, a remote controller, a PDA and the like.

The device may advantageously further include at least one physical marker to aid a user in grasping the device when inputting text, the at least one physical marker being, for example, a variation in feel on a case of the device, a notch on the display screen, a depression on the display screen, a rough surfaced area on the display screen and receptors on the case as a guide for fingers and so forth.

The device may preferably further include a "key location" mode to accurately locate a first key and input text using the virtual keypad after de-activation of the "key location" mode by referencing other keys of the virtual keypad with the first key.

The presentation of the selection of characters may preferably be either by displaying the selection on an available portion of the display screen, or by reading out the characters in the selection to a user. It is possible that the action to select a character in the display of the selection is by contacting the character using the pointer. Alternatively, the action to select a character in the reading of the selection is by breaking contact of the pointer with the first key.

In a third aspect, there is provided a wireless handheld device able to accept text input. The device includes a display screen; and a virtual keypad having a plurality of keys displayed on the display screen. Preferably, a first key of the virtual keypad is operable to display a first character associated with the first key in a text passage shown on the display screen in response to a primary action of a pointer with a first area on the display screen corresponding to the first key, the primary action including the pointer contacting and moving from the first area along either a clock wise or anti-clock wise arc while the pointer is in continual contact with the display screen, and subsequently, a selection of characters associated with the first key is read out to a user sequentially as determined by a distance of the pointer from each character. Preferably, a character from the selection of characters is selected in response to an action of the pointer once the user hears a desired character being read out. The pointer may be either a finger, or a stylus pointer.

The device may provide feedback in accordance with the character selected by a user for display in the text passage. The feedback may be either an aural representation of the character or a visual representation of the character. It is advantageous that the aural feedback allows a user to input characters into the device without viewing the display screen.

The device may be, for example, a mobile phone, a media player, a remote controller, a PDA and the like.

The device may advantageously further include at least one physical marker to aid a user in grasping the device when inputting text, the at least one physical marker being, for example, a variation in feel on a case of the device, a notch on the display screen, a depression on the display screen, a rough surfaced area on the display screen and receptors on the case as a guide for fingers and so forth.

The device may preferably further include a "key location" mode to accurately locate a first key and input text using the virtual keypad after de-activation of the "key location" mode by referencing other keys of the virtual keypad with the first key.

It is preferable that the action to select a character in the reading of the selection is selected from the group consisting of: the pointer breaking contact with the first key and contacting the first key again, the pointer pressing further onto the first key, and the user toggling a confirmation button which is incorporated in the handheld wireless device.

In a fourth aspect, there is provided a method for inputting text on a handheld wireless device including a display screen, and a virtual keypad having a plurality of keys displayed on the display screen. The method includes detecting a first contact with a pointer at a first area on the display screen corresponding to a first key, the first contact including the pointer contacting and moving from the first area along a first direction while the pointer is in continual contact with the display screen; displaying a first character associated with the first key in a text passage shown on the display screen in response to detection of the first contact; detecting a second contact with the pointer at the first area on the display screen corresponding to the first key, the second contact including the pointer contacting and moving from the first area along a second direction while the pointer is in continual contact with the display screen; and displaying a second character associated with the first key in a text passage shown on the display screen in response to detection of the second contact. The pointer may be either a finger, or a stylus pointer.

Preferably, the method may further include providing feedback in accordance with the character selected by a user for display in the text passage. The feedback is either an aural representation of the character or a visual representation of the character. It is advantageous that the aural feedback allows a user to input characters into the device without viewing the display screen.

It is preferable that determining the directions in the method is by comparing a subsequent location of the pointer with the first area on the display screen. The device may be, for example, a mobile phone, a media player, a remote controller, a PDA and the like.

Preferably, the method may further include detecting a first contact occurrence between a pointer and the first area on the display screen corresponding to the first key, contact occurrence being prolonged unbroken contact with the first key; displaying a third character associated with the first key in the text passage shown on the display screen in response; detecting at least two successive contact occurrences between the pointer and the first area on the display screen corresponding to the first key; and changing a mode associated with the first key in the text passage shown on the display screen. Preferably, the mode relates to capitalizing and de-capitalizing the characters generated in the text passage shown on the display screen.

The method may preferably further including grasping the device for inputting text with the aid of at least one physical marker, the at least one physical marker selected from for example, a variation in feel on a case of the device, a notch on the display screen, a depression on the display screen, and a rough surfaced area on the display screen and receptors on the case as a guide for fingers.

The method may also further including locating a first key during a "key location" mode so as to input text using the virtual keypad after de-activation of the "key location" mode by referencing other keys of the virtual keypad with the first key.

In a final aspect, there is provided a method for inputting text on a handheld wireless device including a display screen, and a virtual keypad having a plurality of keys displayed on the display screen. The method includes detecting a first contact occurrence with a pointer at a first area on the display screen corresponding to a first key, contact occurrence being prolonged unbroken contact with the first key; presenting a selection of characters associated with the first key for use in a text passage shown in response to either detection of the first contact occurrence or detection of a primary action; and selecting a character from the selection of characters in response to an action of the pointer. The pointer may be either a finger or a stylus pointer.

Preferably, the method may further include providing feedback in accordance with the character selected by a user for display in the text passage. The feedback is either an aural representation of the character or a visual representation of the character. It is advantageous that the aural feedback allows a user to input characters into the device without viewing the display screen.

It is preferable that determining the directions in the method is by comparing a subsequent location of the pointer with the first area on the display screen. The device may be, for example, a mobile phone, a media player, a remote controller, a PDA and the like.

The method may preferably further including grasping the device for inputting text with the aid of at least one physical marker, the at least one physical marker selected from for example, a variation in feel on a case of the device, a notch on the display screen, a depression on the display screen, and a rough surfaced area on the display screen and receptors on the case as a guide for fingers.

The method may also further including locating a first key during a "key location" mode so as to input text using the virtual keypad after de-activation of the "key location" mode by referencing other keys of the virtual keypad with the first key.

Preferably, the presentation of the selection of characters may be either by displaying the selection on an available portion of the display screen, or by reading out the characters in the selection to a user. The action to select a character in the display of the selection is by contacting the character using the pointer. The action to select a character in the reading of the selection is by breaking contact of the pointer with the first key.

The primary action may include the pointer contacting and moving from the first area along either a clock wise or anti-clock wise arc while the pointer is in continual contact with the display screen. Preferably, the selection of characters associated with the first key are read out sequentially in an order determined by a distance of the pointer to each of the characters denoted in the first key, where the character closest to the pointer is read out. The action to select a character in the reading of the selection is selected from the group consisting of: the pointer breaking contact with the first key and contacting the first key again, the pointer pressing further onto the first key, and the user toggling a confirmation button which is incorporated in the handheld wireless device.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

FIG. 10(*b*) shows a variation in the second usage embodiment of the device.

DESCRIPTION OF PREFERRED EMBODIMENTS

Figure 1:
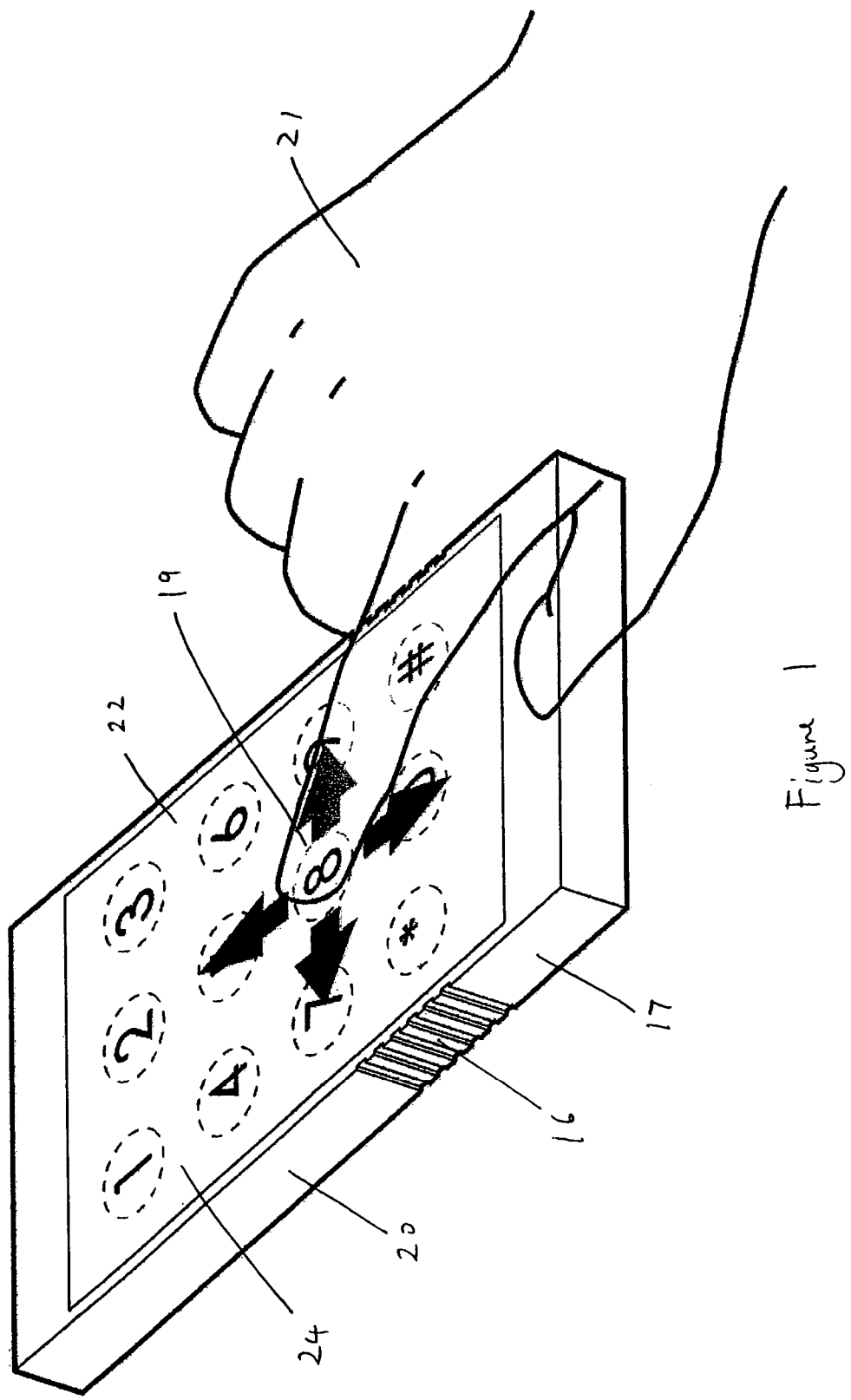
FIG. 1 shows a perspective view of the device.
Figure 15:
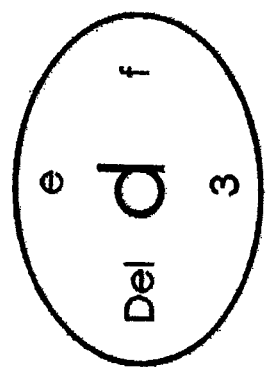
FIG. 15 shows possible representations of a key of the virtual keypad.
Figure 15:
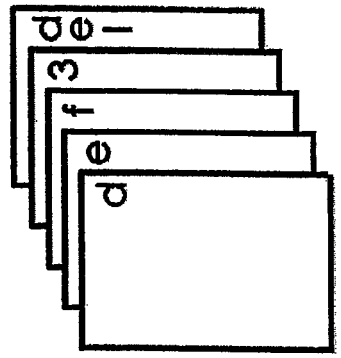
Figure 15:
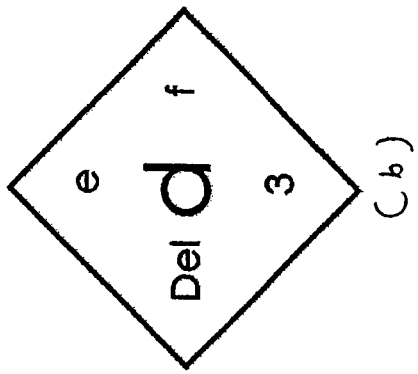
Figure 15:
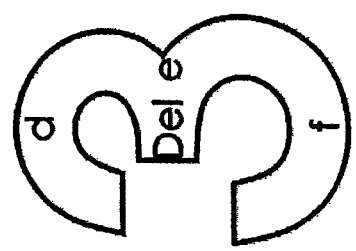
Figure 15:
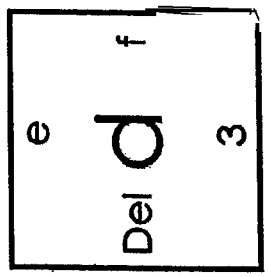
Figure 15:
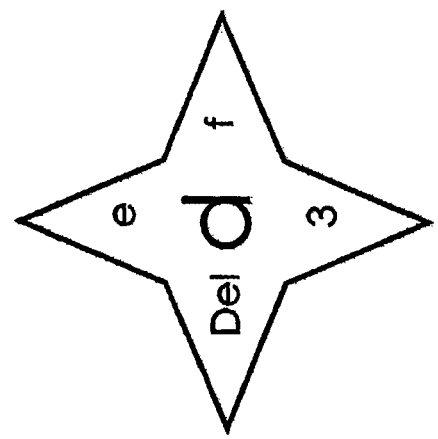

Referring to FIG. 1, there is shown a wireless handheld device 20 which is able to accept text input. The device 20 may be, for example, a mobile phone, a media player, a remote controller, a PDA and the like. The device 20 may include a display screen 22. The display screen 22 may be made from a panel which is sensitive to touch (ie. a touch screen). The display screen 22 may be either a resistive panel or a capacitive panel. The display screen 22 may display a virtual keypad 24 having a plurality of keys, preferably in an arrangement like a numeric keypad. The virtual keypad 24 may be overlaid on the display screen 22 and need not be present on the display screen 22 at all times. The virtual keypad 24 may only appear when required. A hand 21, and more specifically, a finger 19, is shown interacting with the virtual keypad 24. While the finger 19 depicted in FIG. 1 is an index finger, it should be noted that any other finger and a thumb may be used interact with the virtual keypad 24. Furthermore, the shape, numeric labeling and size of each key of the virtual keypad 24 is merely representative and not limiting in any manner. Some examples of labeling for each key is shown in FIG. 15.

Figure 2:
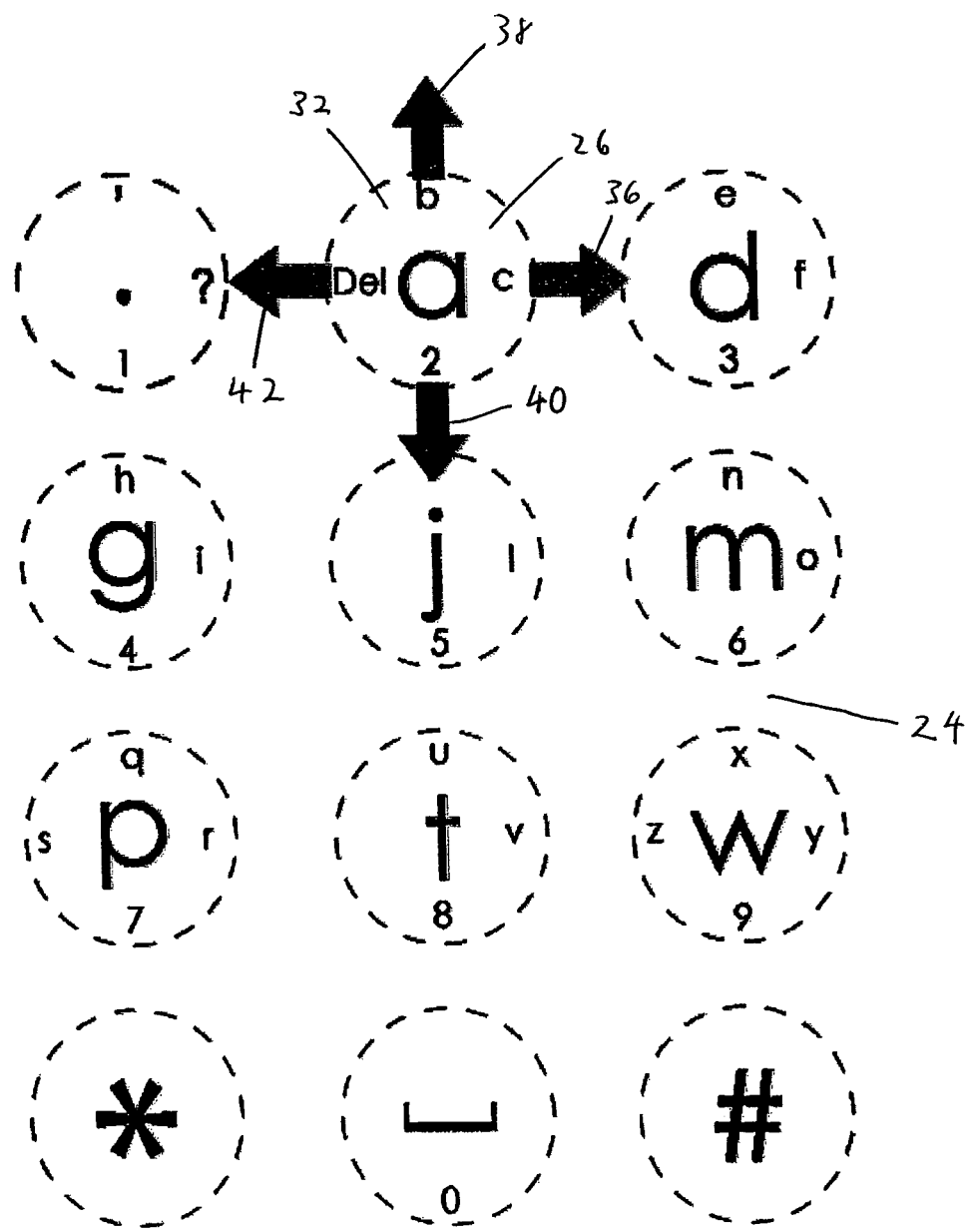
FIG. 2 shows a first example of a first usage embodiment of the device.
Figure 3:
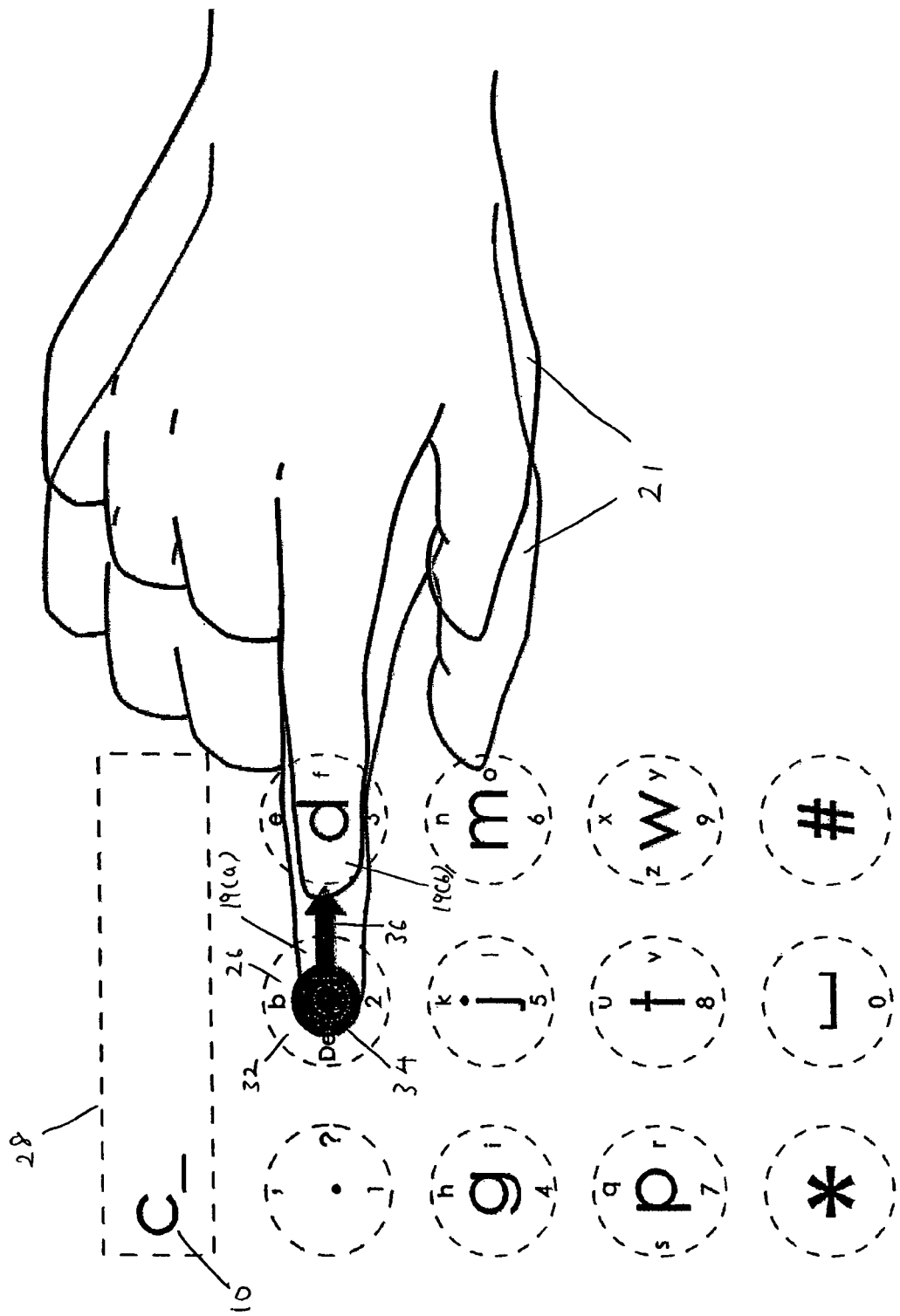
FIG. 3 shows a first step for the first example of the first usage embodiment of the device.
Figure 4:
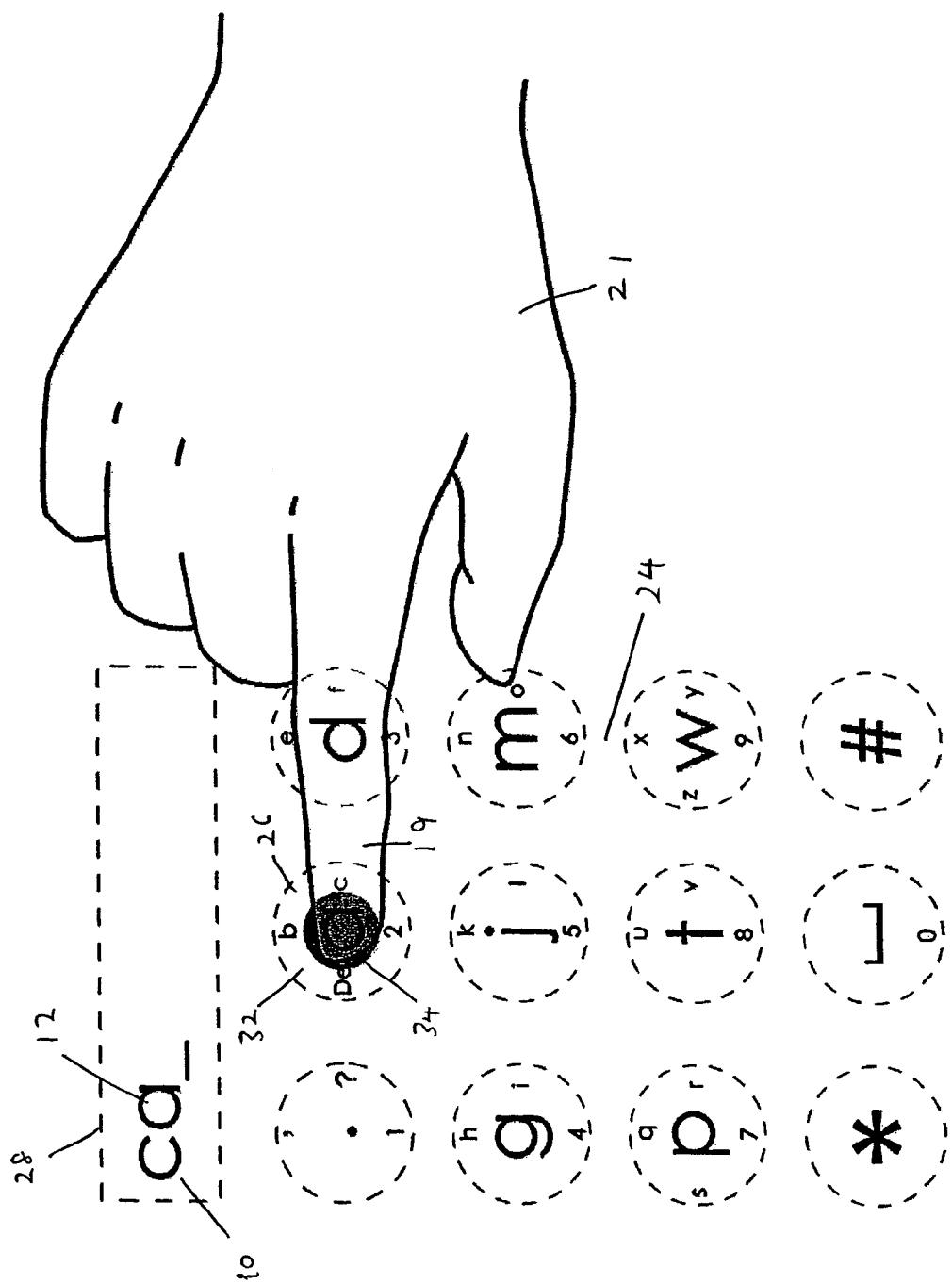
FIG. 4 shows a second step for the first example of the first usage embodiment of the device.
Figure 5:
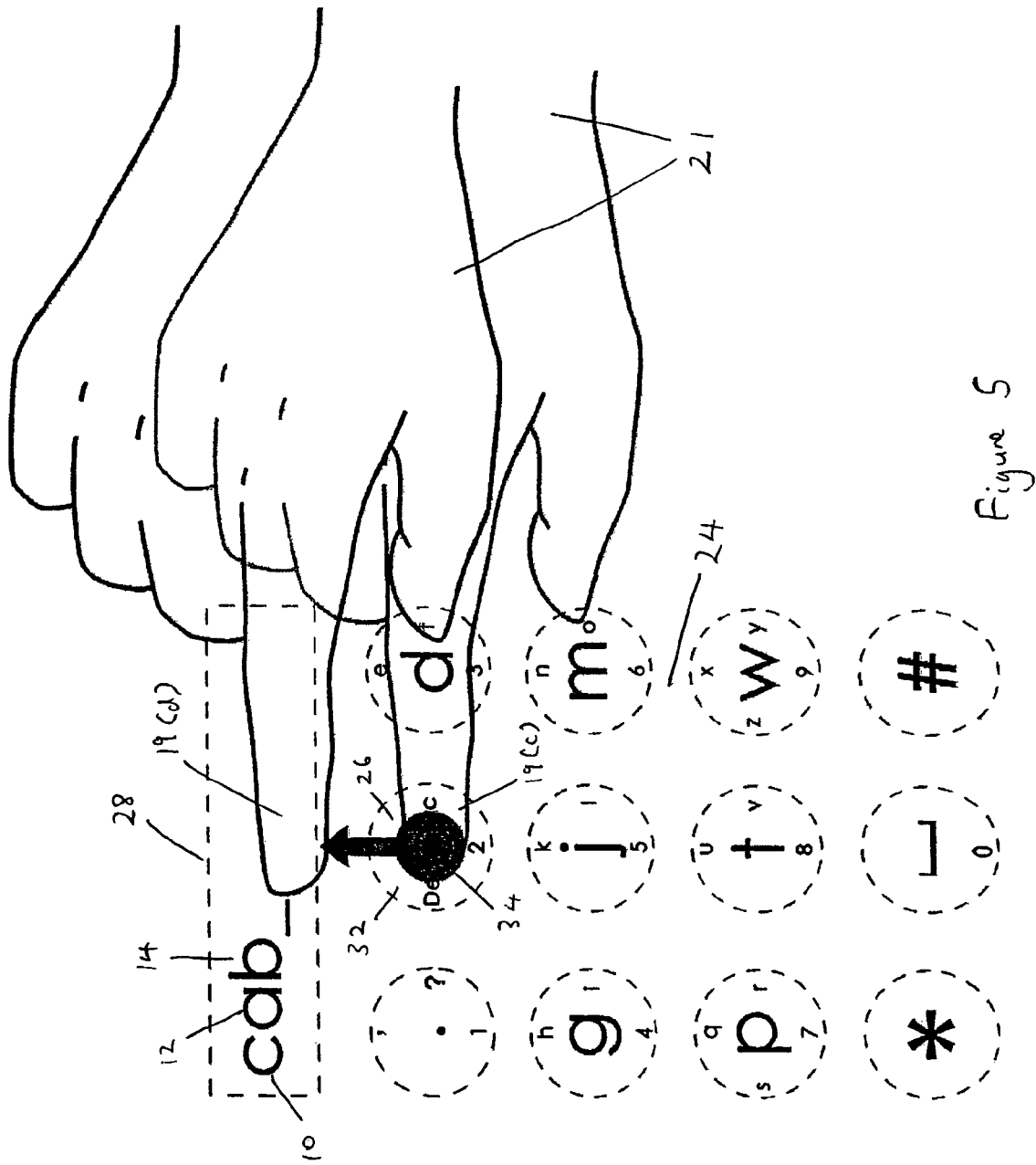
FIG. 5 shows a third step for the first example of the first usage embodiment of the device.

FIG. 2 shows a depiction of the virtual keypad 24 in use in a first example of a first embodiment. Labels of each key are solely meant for the first example and are not limiting. FIGS. 3-5 also aid in describing the first example. A first key "a" 26 of the virtual keypad 24 is operable to display a first character associated with the first key 26 in a text passage 28 shown on the display screen 22. In this instance which is not limiting, the characters associated with the first key 26 are "a, b, c, 2, and <character delete>". The first character is generated in response to a first contact of a finger 19 with a first area 32 on the display screen 22 corresponding to the first key 26. The finger 19 acts as a pointer and it should be noted that a stylus pointer may also be used. In the first example, the first contact includes the finger 19 contacting 34 (depicted by a shaded region in FIG. 3) and moving from the first area 32 along a first direction 36 (right-wards in the orientation as shown in FIGS. 2-5) while the finger 19 is in continual contact with the display screen 22 when moving from position (a) to position (b). When a user does such an act, the character "c" 10 is generated in the text passage 28.

The first key 26 of the virtual keypad 24 may also be operable to display another character associated with the first key 26 in the text passage 28. Reference to FIGS. 2 and 4 is made for this paragraph. A first contact occurrence 34 (depicted by a shaded region in FIG. 4) between the finger 19 and the first area 32 on the display screen 22 corresponding to the first key 26 generates "a" 12 in the text passage 28. Contact occurrence may be prolonged unbroken contact with the first key 26. At least two successive contact occurrences 34 between the finger 19 and the first area 32 on the display screen 22 corresponding to the first key 26 may change a mode from [small caps] to [big caps] for characters shown in the text passage 28. It should be noted that a commonly used function like the mode switching function may be included in more than one key in the keypad 24.

Subsequently, when the finger 19 contacts 34 and moves from the first area 32 along a second direction 38 (up-wards in the orientation as shown in FIGS. 2-5) while the finger 19 is in continual contact with the display screen 22 when moving from position (c) to position (d), the character "b" 14 is generated in the text passage 28. It should be noted that the movement of the finger 19 need not be within the perimeter of the first key 26 as denoted in FIGS. 2-5.

The following section is included to aid in understanding the first example of the first embodiment. When the finger 19 contacts 34 and moves from the first area 32 along a third direction 40 (down-wards in the orientation as shown in FIG. 2) while the finger 19 is in continual contact with the display screen 22, the character "2" is generated in the text passage 28. In a similar manner, when the finger 19 contacts 34 and moves from the first area 32 along a fourth direction 42 (left-wards in the orientation as shown in FIG. 2) while the finger 19 is in continual contact with the display screen 22, the <character delete> function is activated in the text passage 28 for the previously included character(s). It should be noted that a commonly used function like the <character delete> function may be included in more than one key in the keypad 24.

The first, second, third and fourth directions may be determined by comparing a subsequent location of the finger 19 with the first area 32 on the display screen 22. While the four directions as depicted in FIGS. 2-5 are orthogonal, it should be noted that this is not mandatory.

Figure 13:
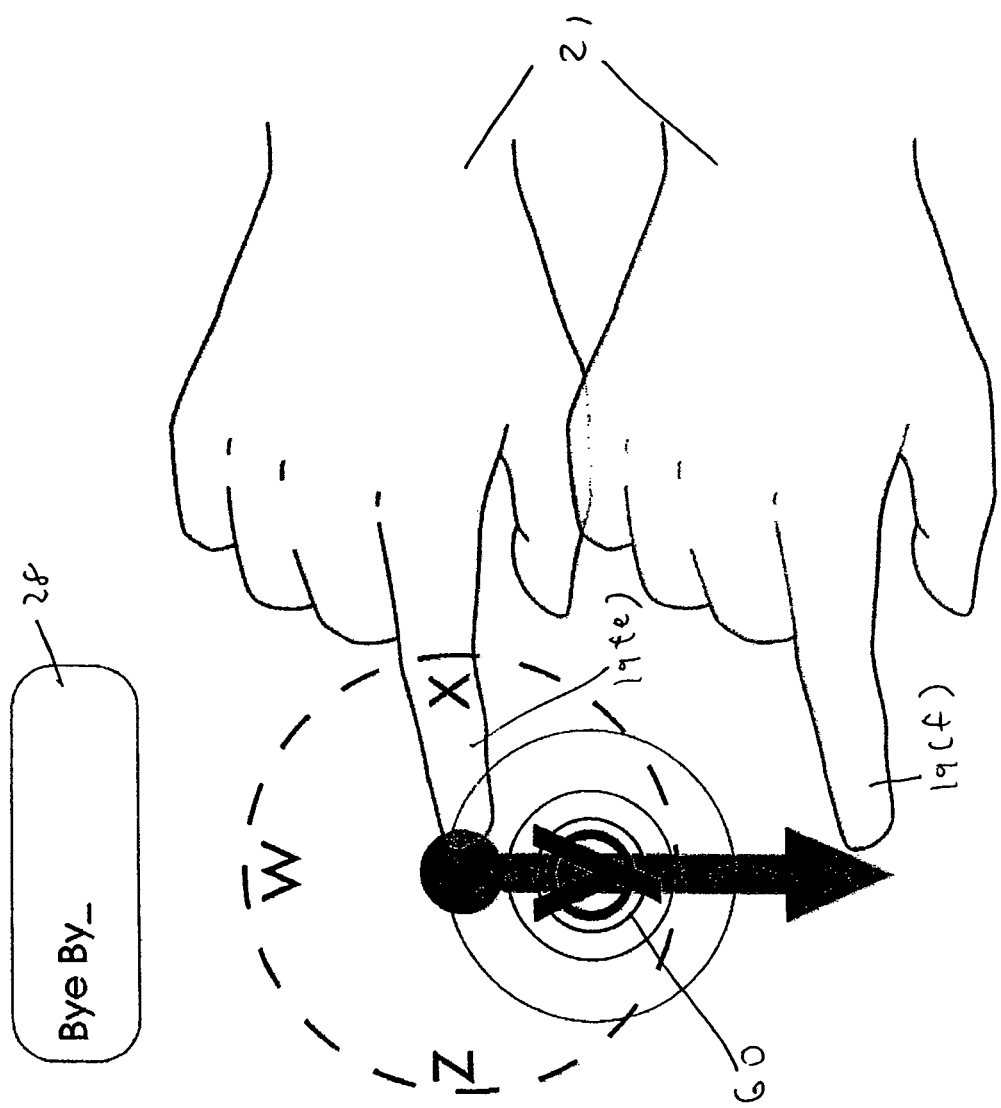
FIG. 13 shows a representation of an example of visual feedback.

During the aforementioned generation of characters on the device 20 in the first example, the device 20 may provide feedback to the user in accordance with the character selected by the user for display in the text passage 28. The feedback is either an aural representation of the character or a visual representation of the character. The aural representation may be, for example, a text to voice conversion for the character, a specific tone/rhythm for the character, a variable frequency audio signal for the character, and so forth. The visual representation may include, for example, flashing sequences for an LED array included in the device 20 (not shown), representing the character in a larger font 60 before minimizing the font size to fit within the text passage 28 (as shown in FIG. 13) and so forth. The variable frequency audio signal may be within the range of frequencies audible to human beings, but certain individuals may not be able to hear some of the signals due to factors, such as, for example, age, hearing impairments and so forth. Each key may have a specific tone/rhythm and contact occurrence movements from each key may generate a portamento variation of the specific tone/rhythm. It is advantageous that the aural feedback by the device 20 allows the user to input characters into the device 20 without viewing the display screen 22 of the device 20.

To further aid the user when inputting characters into the device 20 without viewing the display screen 22, the device 20 may include physical markers to aid the user in grasping the device 20 in the correct orientation and/or correct position. The physical markers may be either on a case 17 of the device 20 or on the display screen 22. The physical markers may be, for example, a variation in feel on the case 17 (such as by using grooves 16 and by using different materials for the case 17), a notch on the display screen 22, a depression on the display screen 22, a rough surfaced area on the display screen 22, receptors on the case 17 as a guide for fingers to be located at a desired position while grasping the device 20, and so forth.

Figure 14:
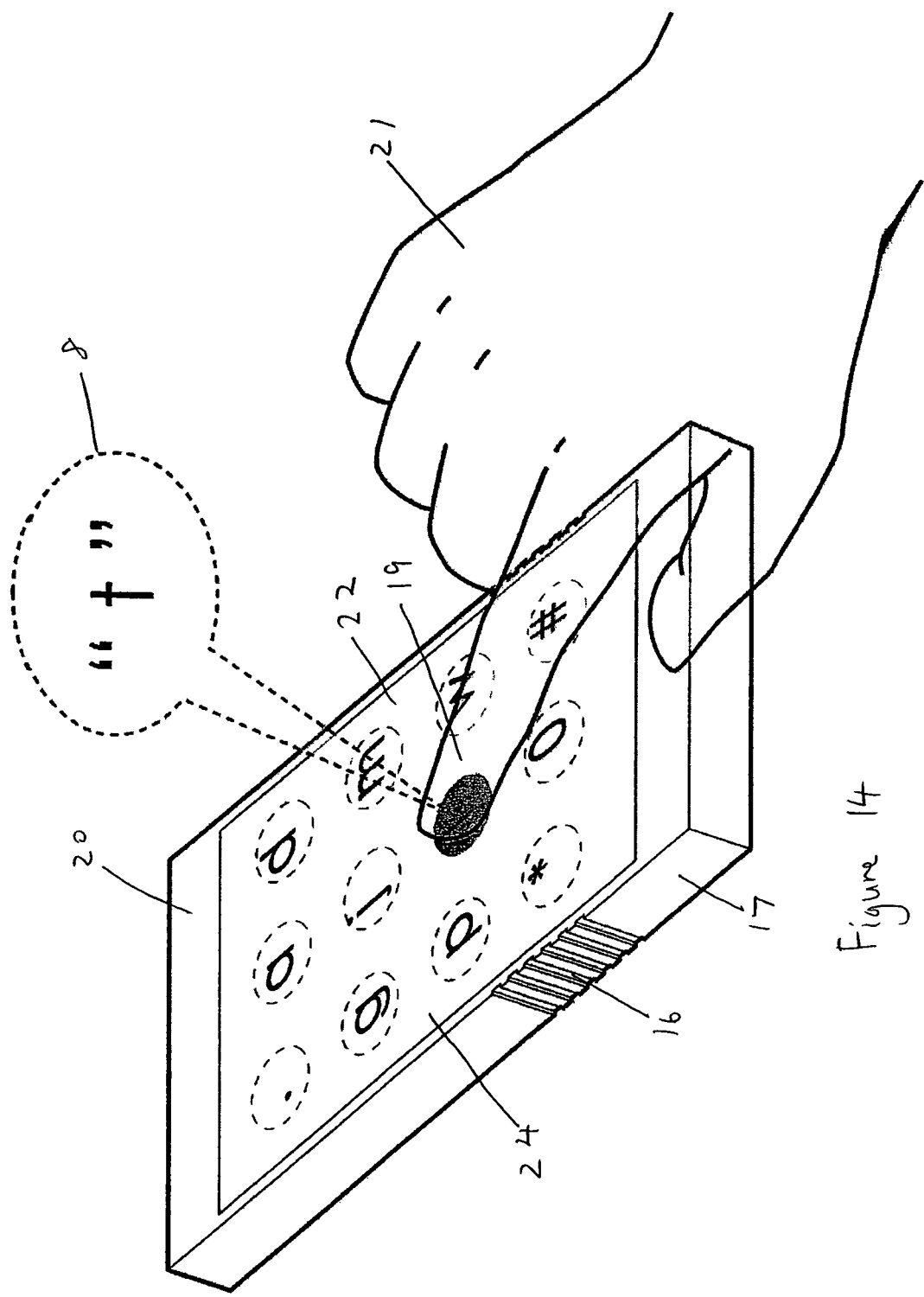
FIG. 14 shows a representation of a "key location" mode.

Referring to FIG. 14, another feature which may be used to aid the user when inputting characters into the device 20 without viewing the display screen 22 involves incorporating a "key location" mode in the device 20. The "key location" mode may be automatically activated at a start of every instance when text input is required or may be activated by the user when desired. In the "key location" mode, the virtual keypad 24 may be present in the display screen 22, but actual text input using the virtual keypad 24 may not be enabled during this "key location" mode which may be activated for a pre-determined period of time prior to the virtual keypad 24 being able to input text. In the "key location" mode which may last for up to three seconds, the user may use the finger 19 to feel for keys of the virtual keypad 24 and contact with each key provides an aural feedback 8 indicating a character associated with the key to the user. In this manner, the user would be able to accurately locate a first key and input text using the virtual keypad 24 after de-activation of the "key location" mode by referencing other keys of the virtual keypad 24 with the first key.

Figure 6:
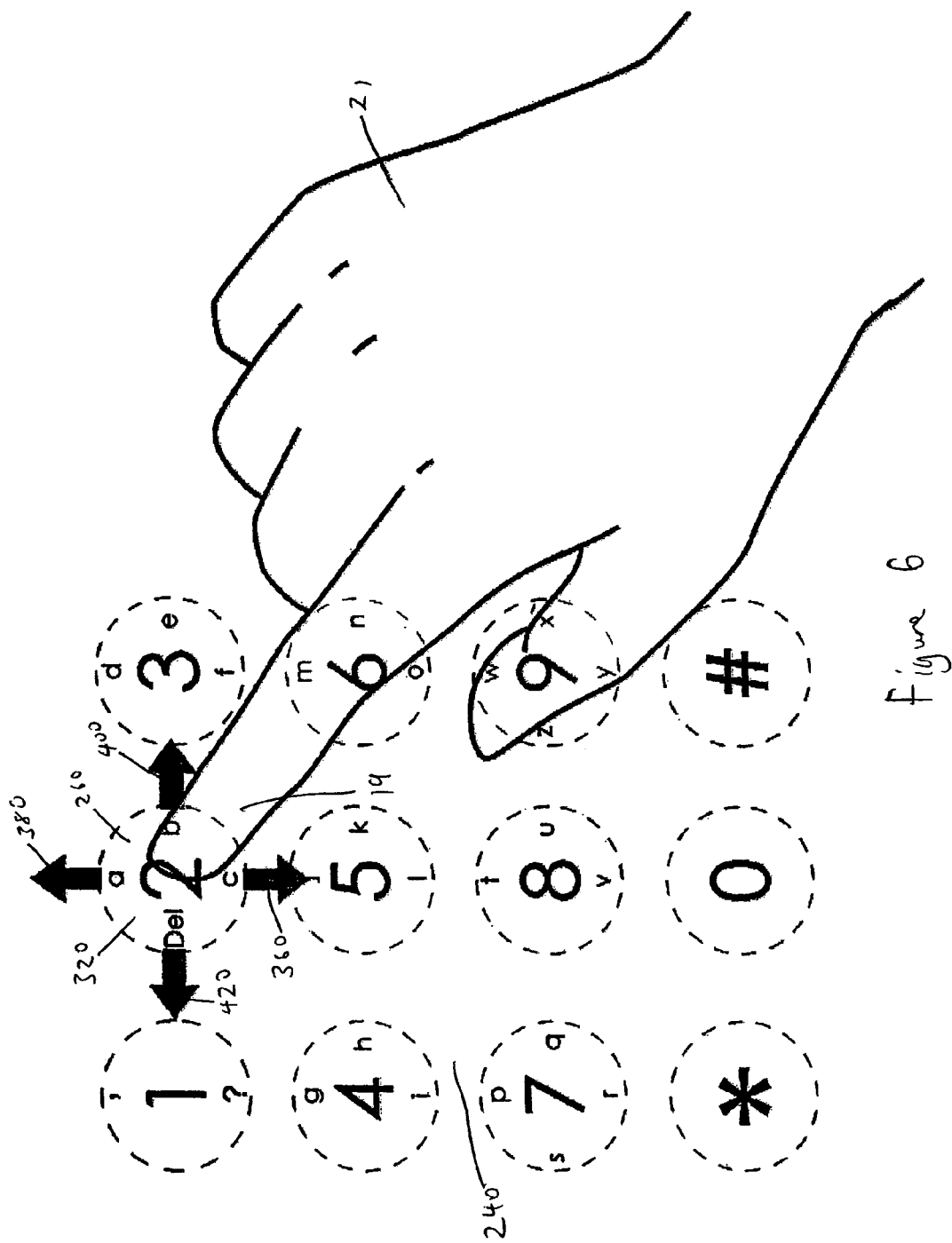
FIG. 6 shows a second example of the first usage embodiment of the device.
Figure 7:
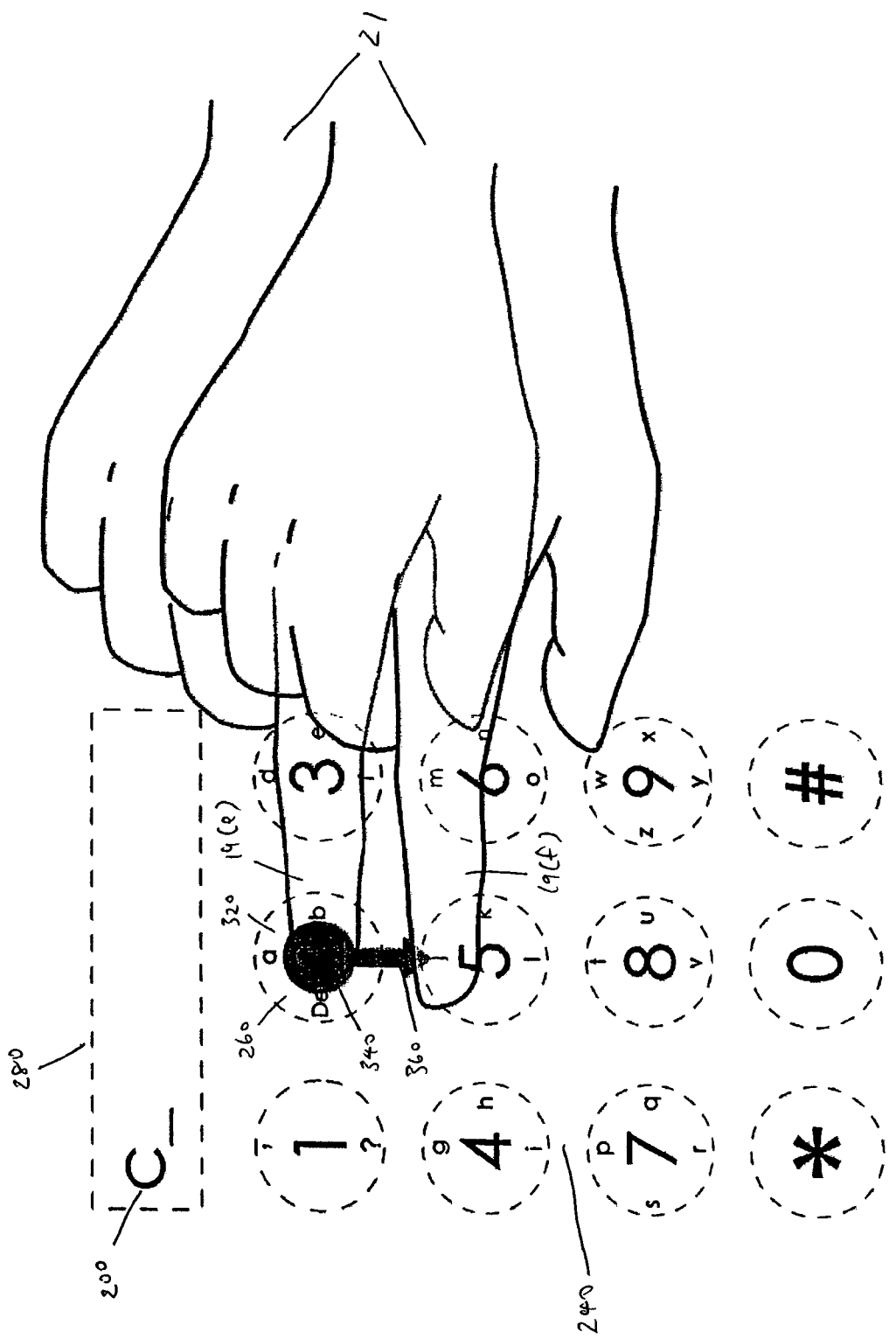
FIG. 7 shows a first step for the second example of the first usage embodiment of the device.
Figure 8:
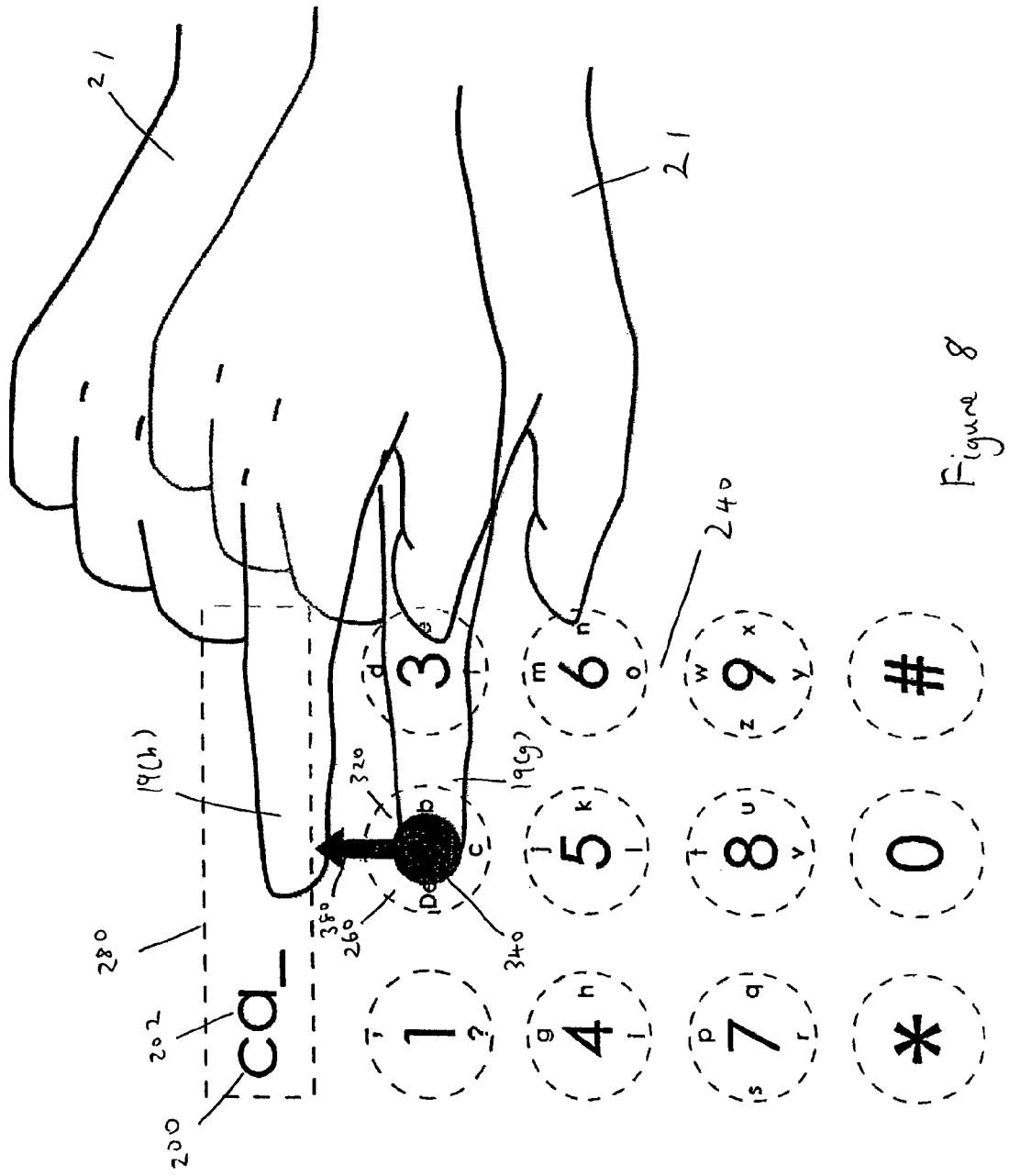
FIG. 8 shows a second step for the second example of the first usage embodiment of the device.
Figure 9:
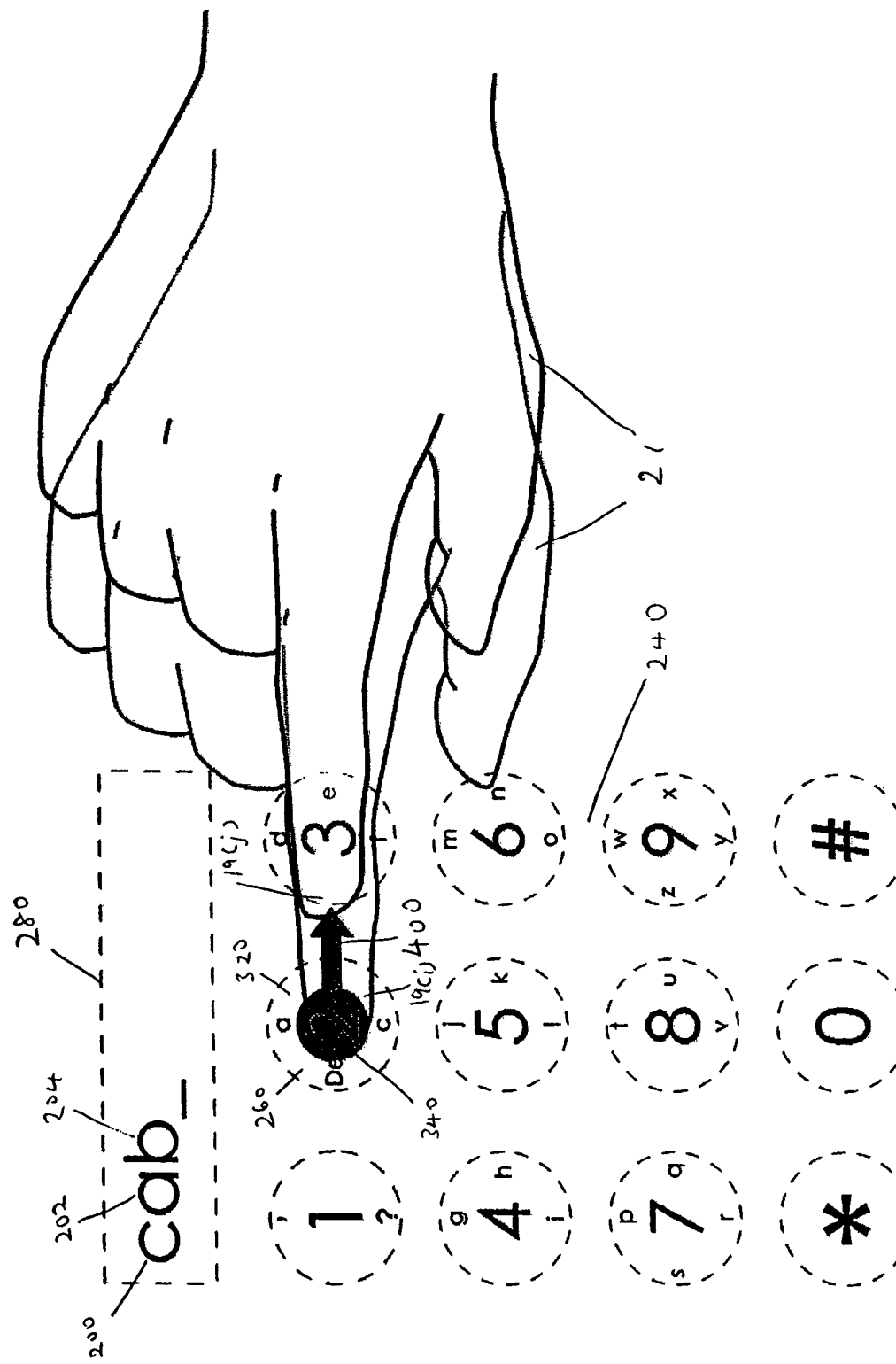
FIG. 9 shows a third step for the second example of the first usage embodiment of the device.

FIG. 6 shows a depiction of the virtual keypad 24 in use in a second example of the first embodiment. A first key "2" 260 of the virtual keypad 240 is operable to display a first character associated with the first key 260 in a text passage 280 shown on the display screen 22. In this instance which is not limiting, the characters associated with the first key 260 are "a, b, c, 2 and <character delete>". The first character is generated in response to a first contact of the finger 19 with a first area 320 on the display screen 22 corresponding to the first key 260. The first contact includes the finger 19 contacting 340 and moving from the first area 320 along a first direction 360 (down-wards in the orientation as shown in FIGS. 6-9) while the finger 19 is in continual contact with the display screen 22 when moving from position (e) to position (f). When the user does such an act, the character "c" 200 is generated in the text passage 280. Similarly, when the finger 19 contacts 340 and moves from the first area 320 along a second direction 380 (up-wards in the orientation as shown in FIGS. 6-9) while the finger 19 is in continual contact with the display screen 22 when moving from position (g) to position (h), the character "a" 202 is generated in the text passage 280. It should be noted that the movement of the finger 19 need not be within the perimeter of the first key 260.

The following section is included to aid in understanding the second example of the first embodiment. When the finger 19 contacts 340 and moves from the first area 320 along a third direction 400 (right-wards in the orientation as shown in FIGS. 6-9) while the finger 19 is in continual contact with the display screen 22 when moving from position (i) to position (j), the character "b" 204 is generated in the text passage 28. In a similar manner, when the finger 19 contacts 34 and moves from the first area 32 along a fourth direction 420 (left-wards in the orientation as shown in FIGS. 6-9) while the pointer 30 is in continual contact with the display screen 22, the <character delete> function is activated in the text passage 280 for the previously included character(s). It should be noted that a commonly used function like the <character delete> function may be included in more than one key in the keypad 24.

The first, second, third and fourth directions may be determined by comparing a subsequent location of the finger 19 with the first area 320 on the display screen 22. While the four directions as depicted in FIG. 6 are orthogonal, it should be noted that this is not mandatory.

The first key 260 of the virtual keypad 240 may also be operable to display a fifth character associated with the first key 260 in the text passage 280. A first contact occurrence 340 between the finger 19 and the first area 320 on the display screen 22 corresponding to the first key 260 generates "2" in the text passage 280. The contact occurrence 340 may be prolonged unbroken contact with the first key 260. At least two successive contact occurrences 340 between the finger 19 and the first area 320 on the display screen 22 corresponding to the first key 260 may change a mode from [small caps] to [big caps] for characters shown in the text passage 280. It should be noted that a commonly used function like the mode switching function may be included in more than one key in the keypad 24.

During the aforementioned generation of characters on the device 20 in the second example, the device 20 may provide feedback to the user in accordance with the character selected by the user for display in the text passage 280. The feedback is either an aural representation of the character or a visual representation of the character. The aural representation may be, for example, a text to voice conversion for the character, a specific tone/rhythm for the character, a variable frequency audio signal for the character, and so forth. The visual representation may include, for example, flashing sequences for an LED array included in the device 20 (not shown), representing the character in a larger font 60 before minimizing the font size to fit within the text passage 28 (as shown in FIG. 13) and so forth. The variable frequency audio signal may be within the range of frequencies audible to human beings, but certain individuals may not be able to hear some of the signals due to factors, such as, for example, age, hearing impairments and so forth. Each key may have a specific tone/rhythm and contact occurrence movements from each key may generate a portamento variation of the specific tone/rhythm. It is advantageous that the aural feedback by the device 20 allows the user to input characters into the device 20 without viewing the display screen 22 of the device 20.

To further aid the user when inputting characters into the device 20 without viewing the display screen 22, the device 20 may include physical markers to aid the user in grasping the device 20 in the correct orientation and/or correct position. The physical markers may be either on a case 17 of the device 20 or on the display screen 22. The physical markers may be, for example, a variation in feel on the case 17 (such as by using grooves 16 and by using different materials for the case 17), a notch on the display screen 22, a depression on the display screen 22, a rough surfaced area on the display screen 22, receptors on the case 17 as a guide for fingers to be located at a desired position while grasping the device 20, and so forth.

Referring to FIG. 14, another feature which may be used to aid the user when inputting characters into the device 20 without viewing the display screen 22 involves incorporating a "key location" mode in the device 20. The "key location" mode may be automatically activated at a start of every instance when text input is required or may be activated by the user when desired. In the "key location" mode, the virtual keypad 24 may be present in the display screen 22, but actual text input using the virtual keypad 24 may not be enabled during this "key location" mode which may be activated for a pre-determined period of time prior to the virtual keypad 24 being able to input text. In the "key location" mode which may last for up to three seconds, the user may use the finger to feel for keys of the virtual keypad 24 and contact with each key provides an aural feedback indicating a character associated with the key to the user. In this manner, the user would be able to accurately locate a first key and input text using the virtual keypad 24 after de-activation of the "key location" mode by referencing other keys of the virtual keypad 24 with the first key.

FIG. 10(a) shows a depiction of the virtual keypad 24 in use in a second embodiment in the device 20. In this embodiment, the first key "3" 26 of the virtual keypad 24 is operable to display a selection 50 of characters associated with the first key 26 for use in the text passage 28 in response to a first contact occurrence 52 of the finger 19 with the first area 32 on the display screen 22 corresponding to the first key 26. In this non limiting illustrative instance, the selection 50 includes "d, e, f, 3, D, E, F and <character delete>". It can be seen that both big and small cap versions of each character are available for selection. Vowels with umlaut marks may also be included in the selection 50. The selection 50 may be presented in an available portion on the display screen 22 and a desired character from the selection 50 of characters may be selected in response to contact of the finger 19 with the portion on the display screen 22 at an area corresponding with a representation of the desired character. As per the first embodiment, a stylus pointer may also be used besides the finger 19.

Figure 10B:
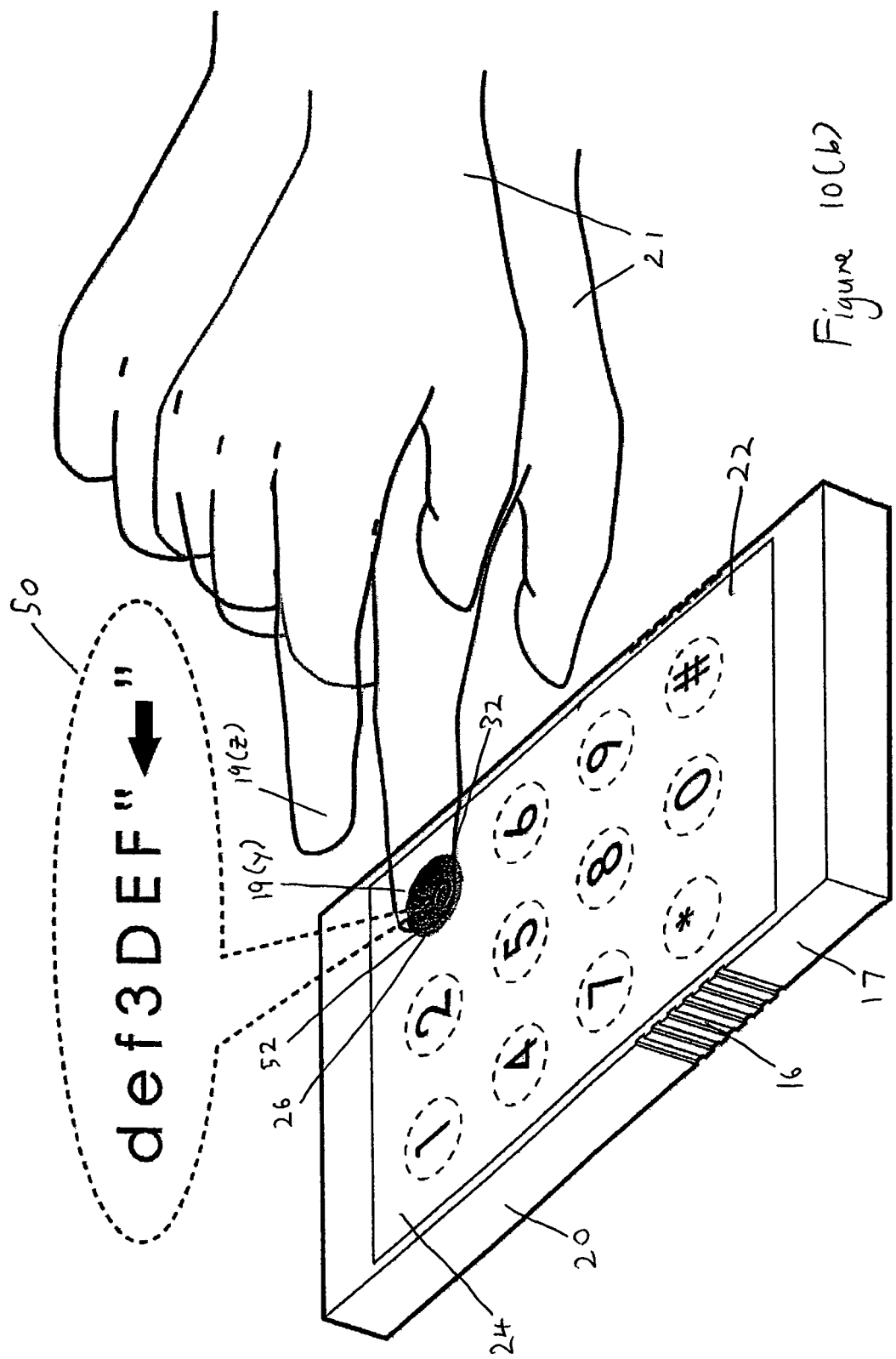
FIG. 10(*a*) shows a second usage embodiment of the device.

Alternatively, as shown in FIG. 10(b), instead of presenting the selection 50 in the available portion on the display screen 22, the selection 50 may be read out to the user while the finger 19 is in continual contact with the first area 32 (shown as 19(y)). Selection of a character occurs when contact is broken between the finger 19 and the first area 32 once the desired character is read out to the user (shown as 19(z)). This also aids the user when inputting characters into the device 20 without viewing the display screen 22 of the device 20.

During the aforementioned generation of characters on the device 20, the device 20 may provide feedback to the user in accordance with the character selected by the user for display in the text passage 28. The feedback may be either an aural representation of the character or a visual representation of the character. The aural representation may be, for example, a text to voice conversion for the selection 50 of characters, a specific tone/rhythm for the character, a variable frequency audio signal for the character, and so forth. The visual representation may include, for example, flashing sequences for an LED array included in the device 20 (not shown), representing the character in a larger font 60 before minimizing the font size to fit within the text passage 28 (as shown in FIG. 13) and so forth. The variable frequency audio signal may be within the range of frequencies audible to human beings, but certain individuals may not be able to hear some of the signals due to factors, such as, for example, age, hearing impairments and so forth. Each key may have a specific tone/rhythm and contact occurrence movements from each key may generate a portamento variation of the specific tone/rhythm. It is advantageous that the aural feedback by the device 20 allows the user to input characters into the device 20 without viewing the display screen 22 of the device 20.

To further aid the user when inputting characters into the device 20 without viewing the display screen 22, the device 20 may include physical markers to aid the user in grasping the device 20 in the correct orientation and/or correct position. The physical markers may be either on a case 17 of the device 20 or on the display screen 22. The physical markers may be, for example, a variation in feel on the case 17 (such as by using grooves 16 and by using different materials for the case 17), a notch on the display screen 22, a depression on the display screen 22, a rough surfaced area on the display screen 22, receptors on the case 17 as a guide for fingers to be located at a desired position while grasping the device 20, and so forth.

Another feature which may be used to aid the user when inputting characters into the device 20 without viewing the display screen 22 involves incorporating a "key location" mode in the device 20. The "key location" mode may be automatically activated at a start of every instance when text input is required or may be activated by the user when desired. In the "key location" mode, the virtual keypad 24 may be present in the display screen 22, but actual text input using the virtual keypad 24 may not be enabled during this "key location" mode which may be activated for a pre-determined period of time prior to the virtual keypad 24 being able to input text. In the "key location" mode which may last for up to three seconds, the user may use the finger to feel for keys of the virtual keypad 24 and contact with each key provides an aural feedback indicating a character associated with the key to the user. In this manner, the user would be able to accurately locate a first key and input text using the virtual keypad 24 after de-activation of the "key location" mode by referencing other keys of the virtual keypad 24 with the first key.

Figure 16:
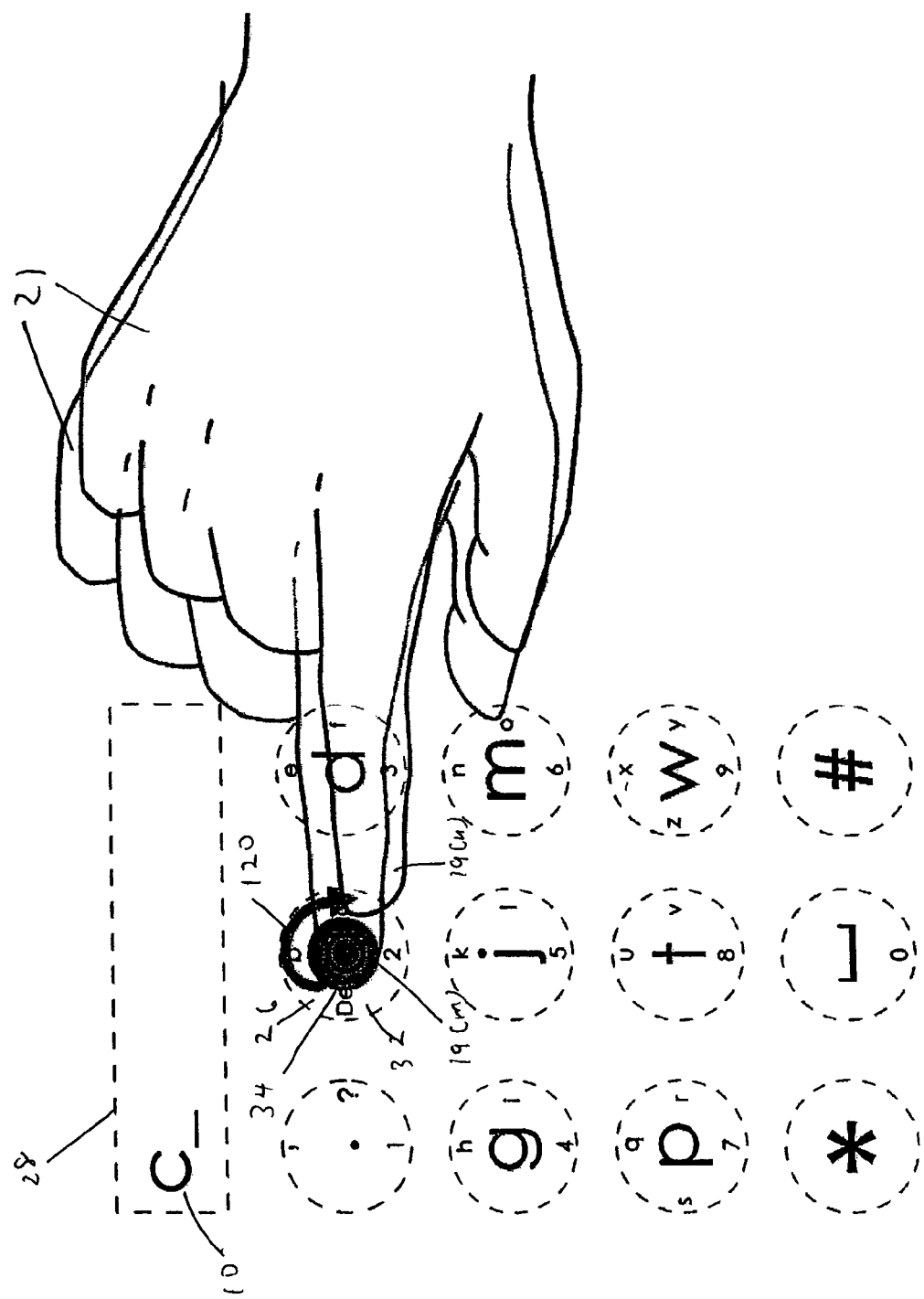
FIG. 16 shows a first step for a third usage embodiment of the device.
Figure 17:
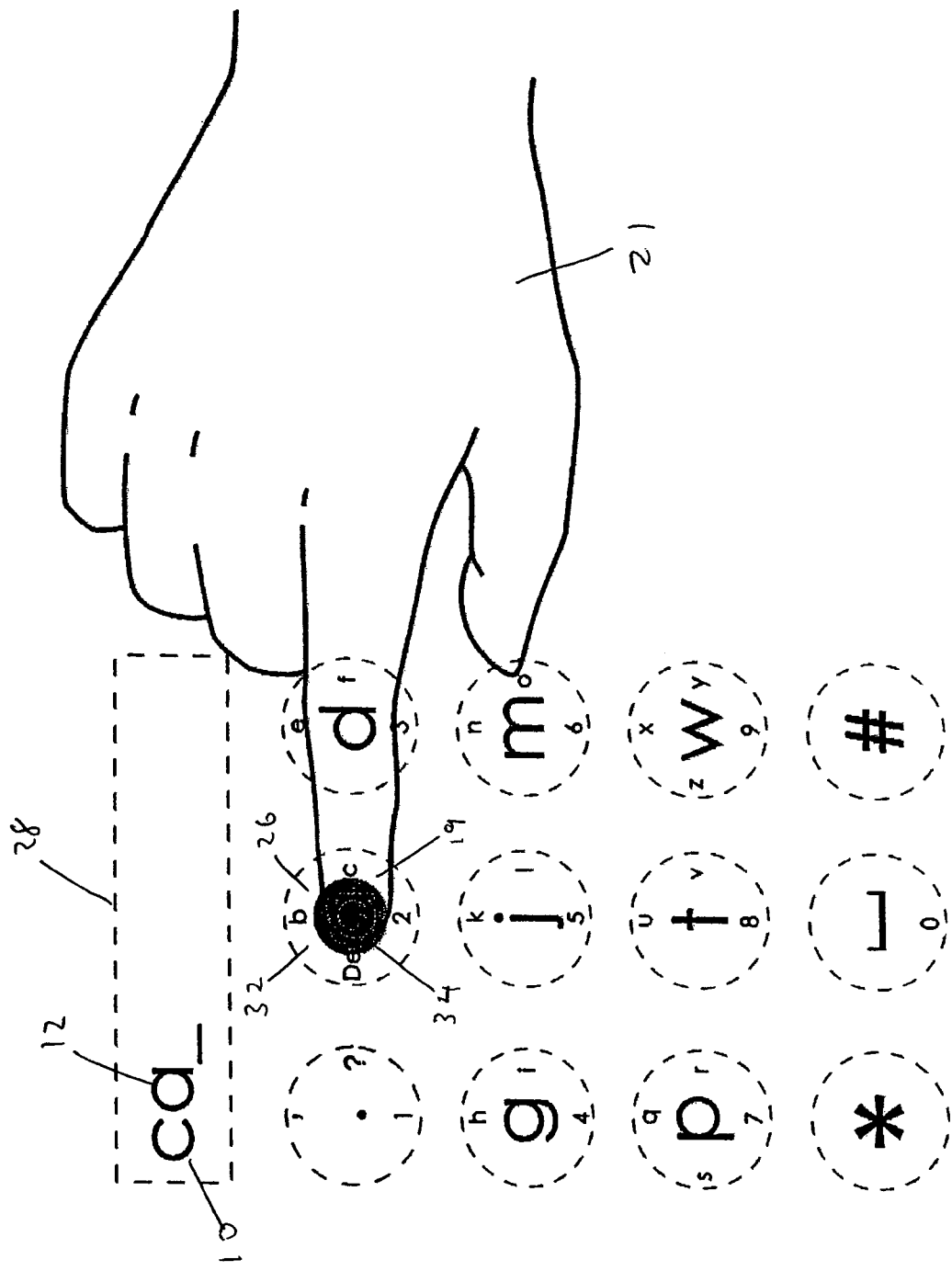
FIG. 17 shows a second step for the third usage embodiment of the device.
Figure 18:
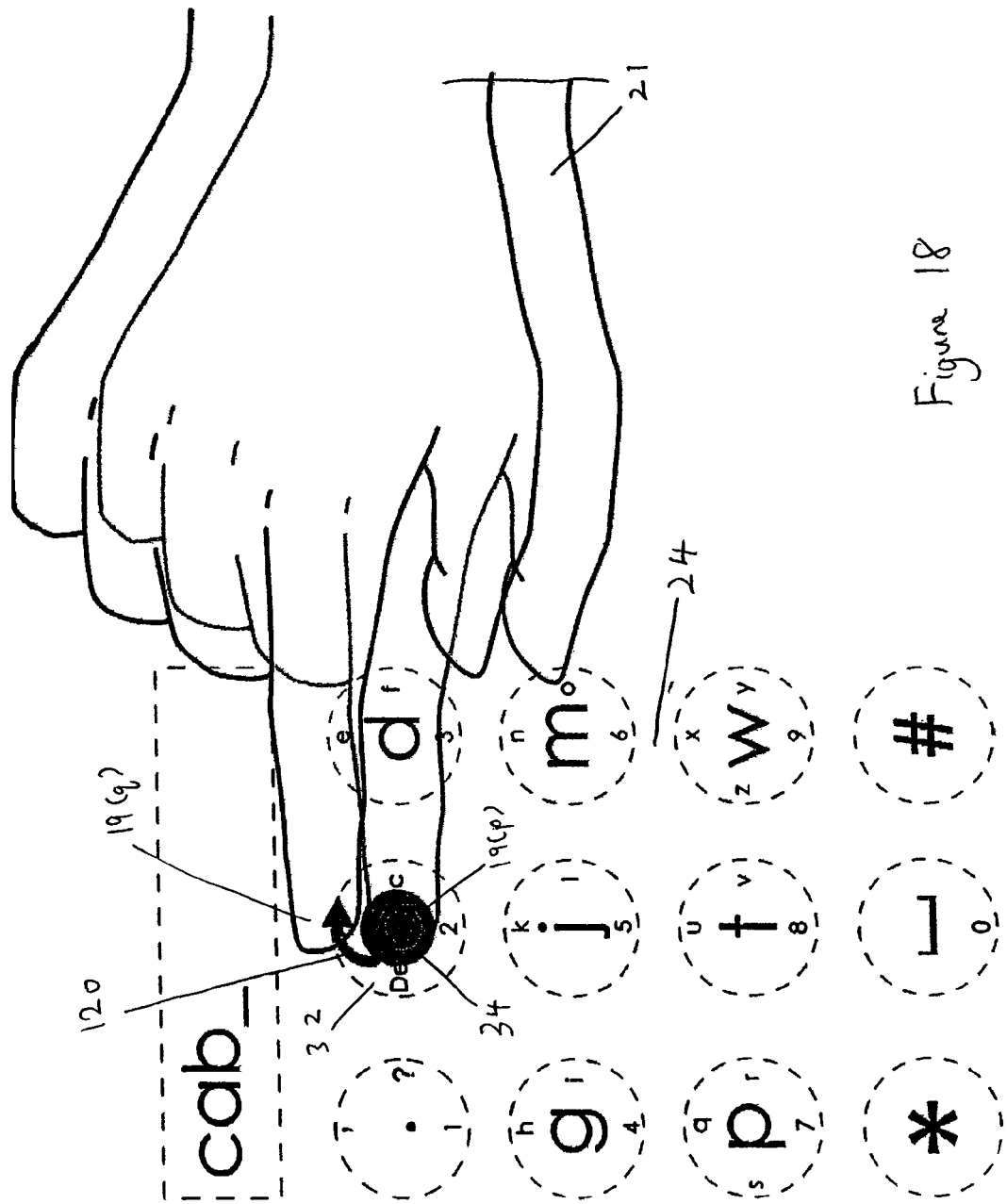
FIG. 18 shows a third step for the third usage embodiment of the device.

FIG. 2 is referred to again to show a depiction of the virtual keypad 24 in use in a third embodiment. FIGS. 16-18 also aid in describing the third example. A first key "a" 26 of the virtual keypad 24 is operable to display a first character associated with the first key 26 in a text passage 28 shown on the display screen 22. In this instance which is not limiting, the characters associated with the first key 26 are "a, b, c, 2, and <character delete>". The first character is generated in response to a primary action of a finger 19 with a first area 32 on the display screen 22 corresponding to the first key 26. The finger 19 acts as a pointer and it should be noted that a stylus pointer may also be used. In the third embodiment, the primary action includes the finger 19 contacting 34 (depicted by a shaded region in FIG. 16) and moving from the first area 32 along a clockwise arc 120 while the finger 19 is in continual contact with the display screen 22 when moving from position (m) to position (n). When a user does such an act, a selection of characters associated with the first key 26 is read out to the user in a sequential order determined by a distance of the finger 19 to each of the characters denoted in the first key 26, where the character closest to the finger 19 is read out. In this example, "a", "b" and "c" are read in sequence as the finger 19 is in close proximity to character "b" on the first key 26 before being in close proximity to character "c" on the first key 26. When "c" is read out, the user initiates an action to select "c" 10 for generation in the text passage 28. The action may be, for example, the finger 19 breaking contact with the first key 26 and contacting the first key 26 again, the finger 19 pressing further onto the first key 26, the user toggling a confirmation button which is incorporated in the device 20 and so forth.

The first key 26 of the virtual keypad 24 may also be operable to display another character associated with the first key 26 in the text passage 28. Reference to FIG. 17 is made for this paragraph. A first contact occurrence 34 (depicted by a shaded region in FIG. 17) between the finger 19 and the first area 32 on the display screen 22 results in "a" being read to the user. When "a" is read out, the user initiates an action to select "a" 12 for generation in the text passage 28. The action may be, for example, the finger 19 breaking contact with the first key 26 and contacting the first key 26 again, the finger 19 pressing further onto the first key 26, the user toggling a confirmation button which is incorporated in the device 20 and so forth. Contact occurrence may be prolonged unbroken contact with the first key 26. At least two successive contact occurrences 34 between the finger 19 and the first area 32 on the display screen 22 corresponding to the first key 26 may change a mode from [small caps] to [big caps] for characters shown in the text passage 28. It should be noted that a commonly used function like the mode switching function may be included in more than one key in the keypad 24.

Subsequently, when the finger 19 contacts 34 and moves from the first area 32 along the clock wise arc 120 (as shown in FIG. 18) while the finger 19 is in continual contact with the display screen 22 when moving from position (p) to position (q), the characters "a" and "b" are read in sequence as the finger 19 is in close proximity to character "b" on the first key 26. When "b" is read out, the user initiates an action to select "b" 14 for generation in the text passage 28. The action may be, for example, the finger 19 breaking contact with the first key 26 and contacting the first key 26 again, the finger 19 pressing further onto the first key 26, the user toggling a confirmation button which is incorporated in the device 20 and so forth. It should be noted that the movement of the finger 19 need not be within the perimeter of the first key 26.

The following section is included to aid in understanding the third embodiment. When the finger 19 contacts 34 and moves from the first area 32 along the clock wise arc 120 (either around or within a perimeter of the key 26) while the finger 19 is in continual contact with the display screen 22, the characters "a, b, c, 2 and <delete>" are read out sequentially as the finger 19 moves in close proximity to each of the aforementioned characters. When the desired character is read out, the user initiates an action to select the character for generation in the text passage 28. The action may be, for example, the finger 19 breaking contact with the first key 26 and contacting the first key 26 again, the finger 19 pressing further onto the first key 26, the user toggling a confirmation button which is incorporated in the device 20 and so forth. The distance of the finger 19 from each character as denoted on the key 26 may be taken to be a straight-line distance.

During the aforementioned generation of characters on the device 20 in the first example, the device 20 may provide feedback to the user in accordance with the character selected by the user for display in the text passage 28. The feedback is either an aural representation of the character or a visual representation of the character. The aural representation may be, for example, a text to voice conversion for the character, a specific tone/rhythm for the character, a variable frequency audio signal for the character, and so forth. The visual representation may include, for example, flashing sequences for an LED array included in the device 20 (not shown), representing the character in a larger font 60 before minimizing the font size to fit within the text passage 28 (as shown in FIG. 13) and so forth. The variable frequency audio signal may be within the range of frequencies audible to human beings, but certain individuals may not be able to hear some of the signals due to factors, such as, for example, age, hearing impairments and so forth. Each key may have a specific tone/rhythm and contact occurrence movements from each key may generate a portamento variation of the specific tone/rhythm. It is advantageous that the aural feedback by the device 20 allows the user to input characters into the device 20 without viewing the display screen 22 of the device 20.

To further aid the user when inputting characters into the device 20 without viewing the display screen 22, the device 20 may include physical markers to aid the user in grasping the device 20 in the correct orientation and/or correct position. The physical markers may be either on a case 17 of the device 20 or on the display screen 22. The physical markers may be, for example, a variation in feel on the case 17 (such as by using grooves 16 and by using different materials for the case 17), a notch on the display screen 22, a depression on the display screen 22, a rough surfaced area on the display screen 22, receptors on the case 17 as a guide for fingers to be located at a desired position while grasping the device 20, and so forth.

Referring to FIG. 14, another feature which may be used to aid the user when inputting characters into the device 20 without viewing the display screen 22 involves incorporating a "key location" mode in the device 20. The "key location" mode may be automatically activated at a start of every instance when text input is required or may be activated by the user when desired. In the "key location" mode, the virtual keypad 24 may be present in the display screen 22, but actual text input using the virtual keypad 24 may not be enabled during this "key location" mode which may be activated for a pre-determined period of time prior to the virtual keypad 24 being able to input text. In the "key location" mode which may last for up to three seconds, the user may use the finger 19 to feel for keys of the virtual keypad 24 and contact with each key provides an aural feedback 8 indicating a character associated with the key to the user. In this manner, the user would be able to accurately locate a first key and input text using the virtual keypad 24 after de-activation of the "key location" mode by referencing other keys of the virtual keypad 24 with the first key.

While movement of the finger 19 along a clock wise arc is mentioned in the third embodiment, it should be noted that movement of the finger 19 along an anti-clock wise arc is also possible.

Figure 11:
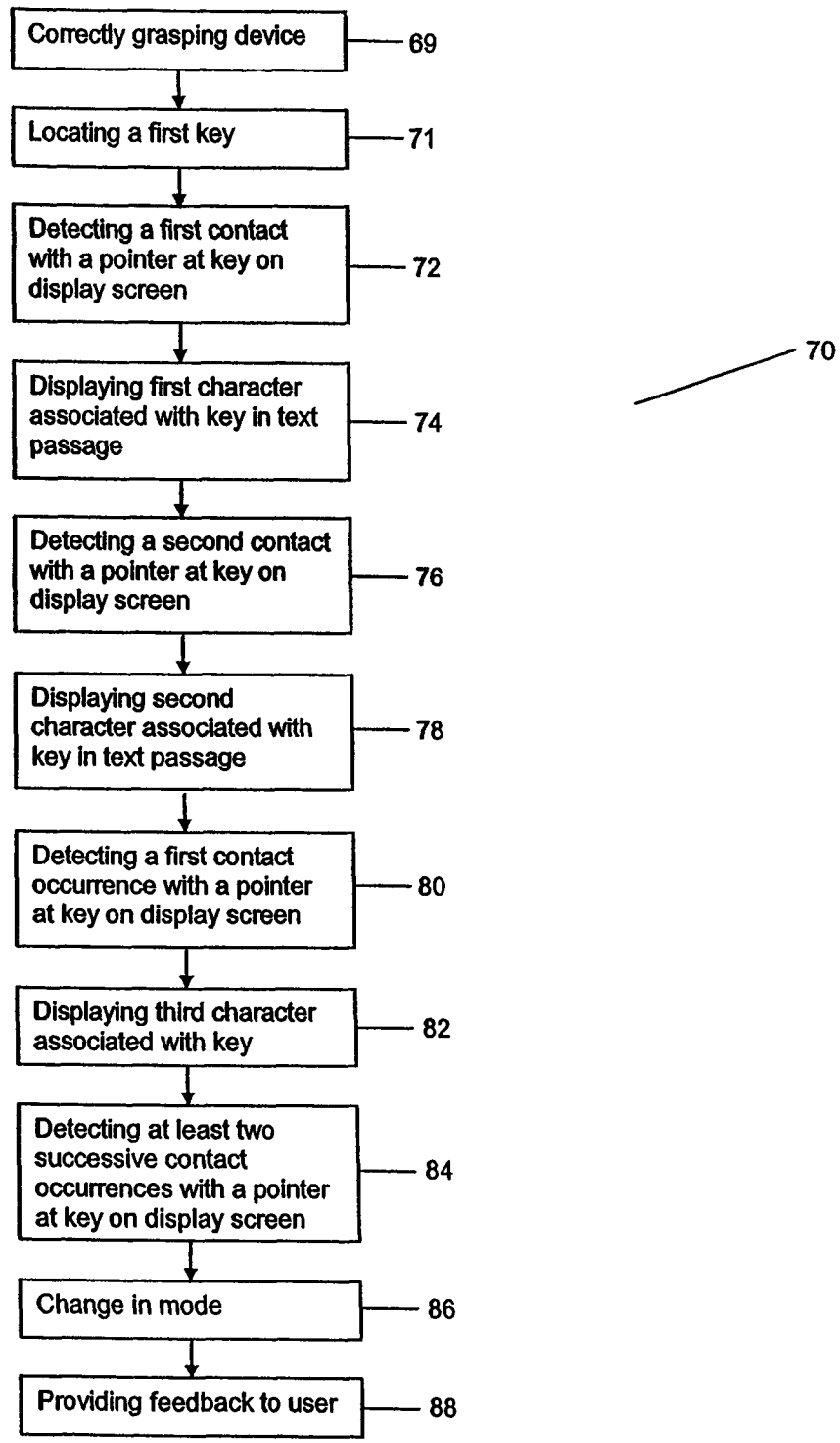
FIG. 11 shows a process flow of a first embodiment of the method.

In another aspect as shown in FIG. 11, there is provided a method 70 for inputting text on a handheld wireless device. The handheld wireless device should include a display screen, and a virtual keypad having a plurality of keys displayed on the display screen. The device may be, for example, a mobile phone, a media player, a remote controller, a PDA and the like. The method 70 includes detecting a first contact with a pointer at a first area on the display screen corresponding to a first key. The first contact may include the pointer contacting and moving from the first area to another position along a first direction while the pointer is in continual contact with the display screen (72). The pointer may be either a finger or a stylus pointer.

A first character associated with the first key may be generated in a text passage shown on the display screen in response to detection of the first contact (74). Similarly, detecting a second contact with the pointer at the first area on the display screen corresponding to the first key (76) with the second contact including the pointer contacting and moving from the first area to another position along a second direction while the pointer is in continual contact with the display screen, would generate a second character associated with the first key in a text passage shown on the display screen (78).

The first, and second directions may be determined by comparing a subsequent location of the pointer with the first area on the display screen. The first and second directions need not be orthogonal to one another. It is also possible to generate a third and subsequent characters depending on the direction which the pointer is moved.

The method 70 may also include detecting a first contact occurrence between a pointer and the first area on the display screen corresponding to the first key (80), contact occurrence being prolonged unbroken contact with the first key. Detection of the first contact occurrence would generate a third character associated with the first key in the text passage shown on the display screen (82). In a similar manner, detection of at least two successive contact (84) occurrences between the pointer and the first area on the display screen corresponding to the first key changes a mode (86) associated with the first key in the text passage shown on the display screen. The mode may relate to capitalizing and de-capitalizing the characters generated in the text passage shown on the display screen.

During the aforementioned method 70, feedback to the user may be provided (88) in accordance with the character selected by the user for display in the text passage. The feedback is either an aural representation of the character or a visual representation of the character. The aural representation may be, for example, a text to voice conversion for the character, a specific tone/rhythm for the character, a variable frequency audio signal for the character, and so forth. The visual representation may include, for example, flashing sequences for an LED array included in the device, representing the character in a larger font 60 before minimizing the font size to fit within the text passage 28 (as shown in FIG. 13) and so forth. The variable frequency audio signal may be within the range of frequencies audible to human beings, but certain individuals may not be able to hear some of the signals due to factors, such as, for example, age, hearing impairments and so forth. Each key may have a specific tone/rhythm and contact occurrence movements from each key may generate a portamento variation of the specific tone/rhythm. It is advantageous that the aural feedback by the device allows the user to input characters into the device without viewing the display screen of the device.

The method 70 may further include correctly grasping the device (69) in a correct orientation and/or correct position. In this regard, the device may include physical markers to aid the user in grasping the device. The physical markers may be either on a case of the device or on the display screen. The physical markers may be, for example, a variation in feel on the case (such as by using grooves and by using different materials for the case), a notch on the display screen, a depression on the display screen, a rough surfaced area on the display screen 22, receptors on the case as a guide for fingers to be located at a desired position while grasping the device, and so forth.

The method 70 may also include locating a key in the virtual keypad (71). There may be a "key location" mode where the virtual keypad may be present in the display screen but actual text input using the virtual keypad may not be enabled for a pre-determined period of time prior to the virtual keypad 24 being able to input text. The "key location" mode may be automatically activated at a start of every instance when text input is required or may be activated by the user when desired. In the "key location" mode which may last for up to three seconds, the user may use the pointer to feel for keys of the virtual keypad and contact with each key provides an aural feedback indicating a character associated with the key to the user. In this manner, the user would be able to accurately locate a first key and input text using the virtual keypad after de-activation of the "key location" mode by referencing other keys of the virtual keypad with the first key.

Figure 12:
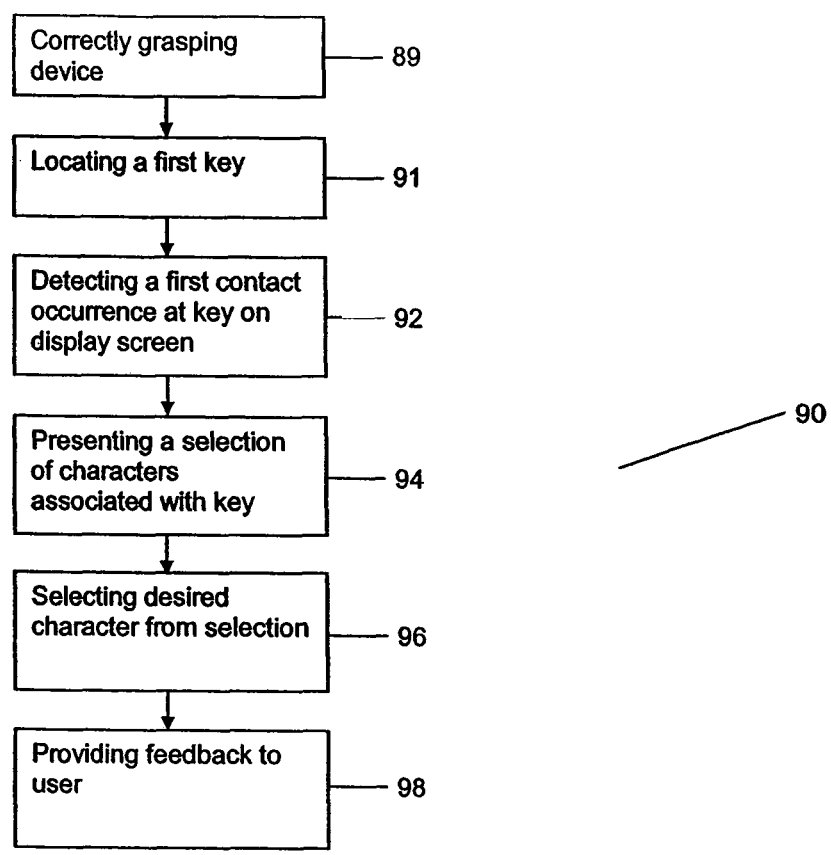
FIG. 12 shows a process flow of a second embodiment of the method.

In a final aspect as shown in FIG. 12, there is shown a method 90 for inputting text on a handheld wireless device which includes a display screen, and a virtual keypad having a plurality of keys displayed on the display screen. The device may be, for example, a mobile phone, a media player, a remote controller, a PDA and the like. The method 90 includes detecting a first contact occurrence with a pointer at a first area on the display screen corresponding to a first key (92), contact occurrence being prolonged unbroken contact with the first key. Subsequently, a selection of characters associated with the first key for use in a text passage shown on the display screen at an available portion on the display screen is displayed (94).

The user may then select a character from the selection of characters by contacting the pointer with the available portion on the display screen at an area corresponding to a representation of the character (96). The pointer may be either a finger or a stylus pointer.

Alternatively, instead of displaying the selection in the available portion on the display screen, the selection may be read out to the user while the pointer is in continual contact with the first area. Selection of a character occurs when contact is broken between the pointer and the first area once the desired character is read out to the user. This also aids the user when inputting characters into the device without viewing the display screen of the device.

It may also be possible that the selection may be read out to the user in response to a primary action, the primary action being moving the pointer from the first area along a clock wise arc either around or within a perimeter of the first key while the pointer is in continual contact with the display screen. The selection of characters associated with the first key are read out sequentially in an order determined by a distance of the pointer to each of the characters denoted in the first key, where the character closest to the pointer is read out. When the desired character is read out, the user initiates an action to select the character for generation in the text passage. The action may be, for example, the pointer breaking contact with the first key and contacting the first key again, the pointer pressing further onto the first key, the user toggling a confirmation button which is incorporated in the handheld wireless device and so forth. The distance of the pointer from each character as denoted on the first key may be taken to be a straight-line distance.

While movement of the pointer along a clock wise arc is mentioned in the preceding paragraph, it should be noted that movement of the pointer along an anti-clock wise arc is also possible.

During the aforementioned method 90, feedback to the user may be provided (98) in accordance with the character selected by the user for display in the text passage. The feedback is either an aural representation of the character or a visual representation of the character. The aural representation may be, for example, a text to voice conversion for the character, a specific tone/rhythm for the character, a variable frequency audio signal for the character, and so forth. The visual representation may include, for example, flashing sequences for an LED array included in the device, representing the character in a larger font 60 before minimizing the font size to fit within the text passage 28 (as shown in FIG. 13) and so forth. The variable frequency audio signal may be within the range of frequencies audible to human beings, but certain individuals may not be able to hear some of the signals due to factors, such as, for example, age, hearing impairments and so forth. Each key may have a specific tone/rhythm and contact occurrence movements from each key may generate a portamento variation of the specific tone/rhythm. It is advantageous that the aural feedback by the device allows the user to input characters into the device without viewing the display screen of the device.

The method 90 may further include correctly grasping the device (91) in a correct orientation and/or correct position. In this regard, the device may include physical markers to aid the user in grasping the device. The physical markers may be either on a case of the device or on the display screen. The physical markers may be, for example, a variation in feel on the case (such as by using grooves and by using different materials for the case), a notch on the display screen, a depression on the display screen, a rough surfaced area on the display screen, receptors on the case as a guide for fingers to be located at a desired position while grasping the device, and so forth.

The method 90 may also include locating a key in the virtual keypad (91). There may be a "key location" mode where the virtual keypad may be present in the display screen but actual text input using the virtual keypad may not be enabled for a pre-determined period of time prior to the virtual keypad 24 being able to input text. The "key location" mode may be automatically activated at a start of every instance when text input is required or may be activated by the user when desired. In the "key location" mode which may last for up to three seconds, the user may use the pointer to feel for keys of the virtual keypad and contact with each key provides an aural feedback indicating a character associated with the key to the user. In this manner, the user would be able to accurately locate a first key and input text using the virtual keypad after de-activation of the "key location" mode by referencing other keys of the virtual keypad with the first key.

Whilst there has been described in the foregoing description preferred embodiments of the present invention, it will be understood by those skilled in the technology concerned that many variations or modifications in details of design or construction may be made without departing from the present invention.

The invention claimed is:

1. A wireless handheld device able to accept text input, the device including:
   a display screen; and
   a virtual keypad having a plurality of keys displayed on the display screen;
   wherein a first key of the virtual keypad is operable to display a first character associated with the first key in a text passage shown on the display screen in response to a first contact of a pointer with a first area on the display screen corresponding to the first key, the first contact including the pointer contacting and moving from the first area along a first direction while the pointer is in continual contact with the display screen;
   wherein the first key of the virtual keypad is also operable to display a second character associated with the first key in the text passage shown on the display screen in response to a second contact of the pointer with the first area on the display screen corresponding to the first key, the second contact including the pointer contacting and moving from the first area along a second direction while the pointer is in continual contact with the display screen;
   wherein the device provides feedback for a user in a manner so as to allow a user to input at least one of the first and second characters into the device without viewing the display screen, the feedback being an aural representation of at least one of the first and second characters, aural representation being based at least on continual contact of the pointer with the display screen when moved from the first area along the second direction, and
   wherein each key is associable with one of a tone and rhythm, and aural representation includes generating a portamento variation of the tone or rhythm during contact occurrence movements from each key.

2. The device of claim 1, wherein the pointer is an object selected from the group consisting of: a finger, and a stylus pointer.

3. The device of claim 1, wherein the directions are determined by comparing a subsequent location of the pointer with the first area on the display screen.

4. The device of claim 1 being selected from the group consisting of: mobile phone, media player, remote controller, and PDA.

5. The device of claim 1, further including at least one physical marker to aid a user in grasping the device when inputting text, the at least one physical marker selected from the group consisting of: a variation in feel on a case of the device, a notch on the display screen, a depression on the display screen, and a rough surfaced area on the display screen and receptors on the case as a guide for fingers.

6. The device of claim 1, further including a "key location" mode to accurately locate a first key and input text using the virtual keypad after de-activation of the "key location" mode by referencing other keys of the virtual keypad with the first key.

7. A wireless handheld device able to accept text input, the device including:
- a display screen; and
- a virtual keypad having a plurality of keys displayed on the display screen;
- wherein a first key of the virtual keypad is operable to present a selection of characters associated with the first key for use in a text passage shown on the display screen in response to a first contact occurrence of a pointer with a first area on the display screen corresponding to the first key, contact occurrence being prolonged unbroken contact with the first key;
- wherein a character from the selection of characters is selected in response to an action of the pointer;
- wherein the device provides feedback for a user in a manner so as to allow a user to input characters from the selection of characters into the device without viewing the display screen, the feedback being an aural representation of a character from the selection of characters, aural representation being based at least on continual contact of the pointer with the display screen when moved from the first area along the second direction, and
- wherein each key is associable with one of a tone and rhythm, and aural representation includes generating a portamento variation of the tone or rhythm during contact occurrence movements from each key.

8. The device of claim 7, wherein the presentation of the selection of characters is either by displaying the selection on an available portion of the display screen, or by reading out the characters in the selection to a user.

9. The device of claim 8, wherein the action to select a character in the display of the selection is by contacting the character using the pointer.

10. The device of claim 8, wherein the action to select a character in the reading of the selection is by breaking contact of the pointer with the first key.

11. A method for inputting text on a handheld wireless device including a display screen, and a virtual keypad having a plurality of keys displayed on the display screen, the method including:
- detecting a first contact with a pointer at a first area on the display screen corresponding to a first key, the first contact including the pointer contacting and moving from the first area along a first direction while the pointer is in continual contact with the display screen;
- displaying a first character associated with the first key in a text passage shown on the display screen in response to detection of the first contact;
- detecting a second contact with the pointer at the first area on the display screen corresponding to the first key, the second contact including the pointer contacting and moving from the first area along a second direction while the pointer is in continual contact with the display screen;
- displaying a second character associated with the first key in a text passage shown on the display screen in response to detection of the second contact; and
- providing feedback for a user in a manner so as to allow a user to input at least one of the first and second characters into the device without viewing the display screen, the feedback being an aural representation of at least one of the first and second characters, aural representation being based at least on continual contact of the pointer with the display screen when moved from the first area along the second direction,
- wherein each key is associable with one of a tone and rhythm, and aural representation includes generating a portamento variation of the tone or rhythm during contact occurrence movements from each key.

12. The method of claim 11, wherein the directions are determined by comparing a subsequent location of the pointer with the first area on the display screen.

13. The method of claim 11, further including grasping the device for inputting text with the aid of at least one physical marker, the at least one physical marker selected from the group consisting of: a variation in feel on a case of the device, a notch on the display screen, a depression on the display screen, and a rough surfaced area on the display screen and receptors on the case as a guide for fingers.

14. The method of claim 11, further including locating a first key during a "key location" mode so as to input text using the virtual keypad after de-activation of the "key location" mode by referencing other keys of the virtual keypad with the first key.

15. A method for inputting text on a handheld wireless device including a display screen, and a virtual keypad having a plurality of keys displayed on the display screen, the method including:
- detecting a first contact occurrence with a pointer at a first area on the display screen corresponding to a first key, contact occurrence being prolonged unbroken contact with the first key;
- presenting a selection of characters associated with the first key for use in a text passage shown in response to either detection of the first contact occurrence or detection of a primary action;
- selecting a character from the selection of characters in response to an action of the pointer; and
- providing feedback for a user in a manner so as to allow a user to input characters from the selection of characters into the device without viewing the display screen, the feedback being an aural representation of a character from the selection of characters, aural representation being based at least on continual contact of the pointer with the display screen when moved from the first area along the second direction,
- wherein each key is associable with one of a tone and rhythm, and aural representation includes generating a portamento variation of the tone or rhythm during contact occurrence movements from each key.

16. The method of claim 15, wherein the presentation of the selection of characters is either by displaying the selection on an available portion of the display screen, or by reading out the characters in the selection to a user.

17. The method of claim 16, wherein the action to select a character in the display of the selection is by contacting the character using the pointer.

18. The method of claim 16, wherein the action to select a character in the reading of the selection is by breaking contact of the pointer with the first key.

19. The method of claim 15, wherein the primary action includes the pointer contacting and moving from the first area along either a clock wise or anti-clock wise arc while the pointer is in continual contact with the display screen.

20. The method of claim 19, wherein the selection of characters associated with the first key are read out sequentially in an order determined by a distance of the pointer to each of the characters denoted in the first key, where the character closest to the pointer is read out.

21. The method of claim 20, wherein the action to select a character in the reading of the selection is selected from the group consisting of: the pointer breaking contact with the first key and contacting the first key again, the pointer pressing further onto the first key, and the user toggling a confirmation button which is incorporated in the handheld wireless device.

\* \* \* \* \*